United States Patent [19]
Bardutz et al.

[11] Patent Number: 4,766,606
[45] Date of Patent: Aug. 23, 1988

[54] SIGNAL REPEATER FOR MULTI SUBSCRIBER COMMUNICATION OVER SINGLE PAIR TELEPHONE LINE

[75] Inventors: Ronald W. Bardutz, Vancouver; Joseph P. Kortje, Saskatoon; Craig P. Twardy, Regina, all of Canada

[73] Assignee: Dell Canada Marketing Corp., Vancouver, Canada

[21] Appl. No.: 54,428

[22] Filed: May 21, 1987

[51] Int. Cl.$^4$ ............................................. H04L 25/60
[52] U.S. Cl. ..................................... 379/344; 370/26; 370/97; 375/4
[58] Field of Search ............... 379/338, 339, 341, 342, 379/343, 344, 166; 370/29, 56, 97, 26; 375/4; 178/70 R, 71 R

[56] References Cited
U.S. PATENT DOCUMENTS 4,333,175 6/1982 Cook et al. ........................ 370/56

Primary Examiner—Eugene R. LaRoche
Assistant Examiner—David Mis
Attorney, Agent, or Firm—Marger & Johnson

[57] ABSTRACT

A signal repeater for regenerating digitally encoded signals transmitted in bursts over a single pair telephone line to enable simultaneous communication between a telephone central office and any one of up to four subscriber transmitter/receivers. The repeater decouples signals from the line for regeneration thereof and recouples the regenerated signals onto the line. Clock frequency and phase information characteristic of the decoupled signals is derived in order to facilitate accurate regeneration of the signals. The decoupled signals are decoded and then regenerated to replicate the signals originally produced by the telephone central office and subscriber transmitter/receivers respectively. The regenerated signals are then re-encoded and recoupled onto the telephone line.

17 Claims, 31 Drawing Sheets

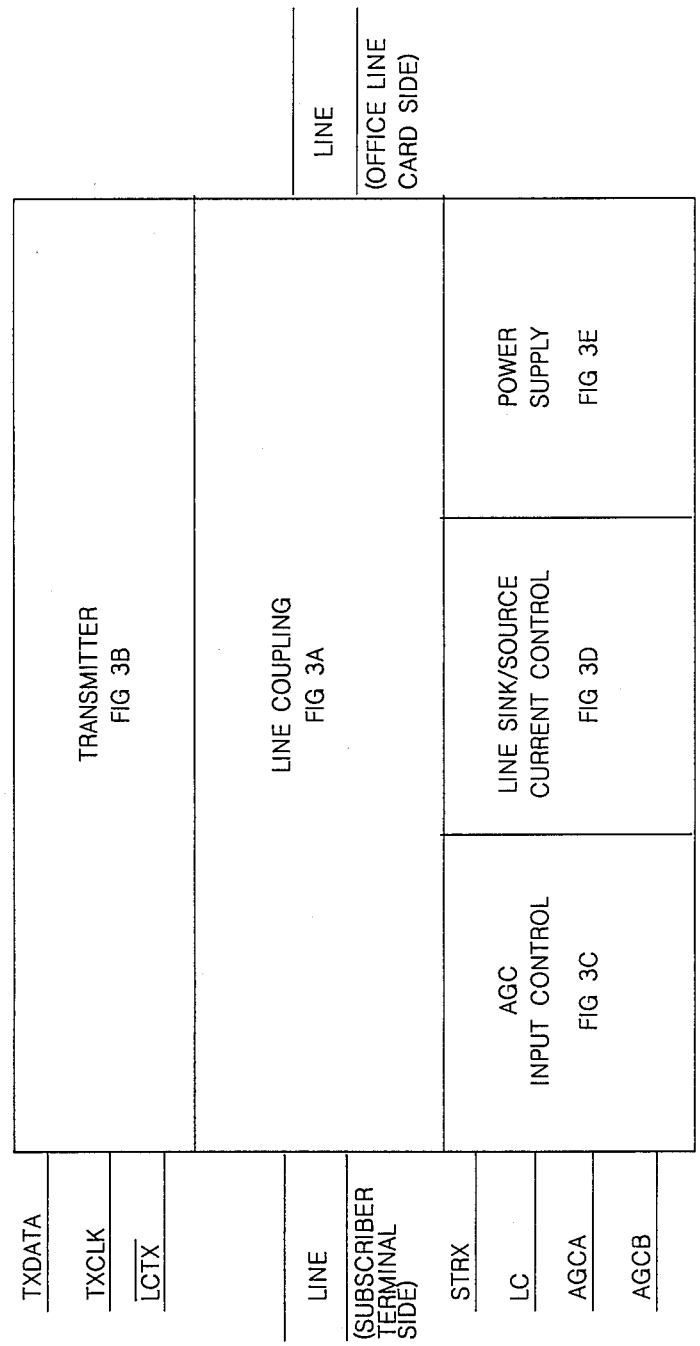

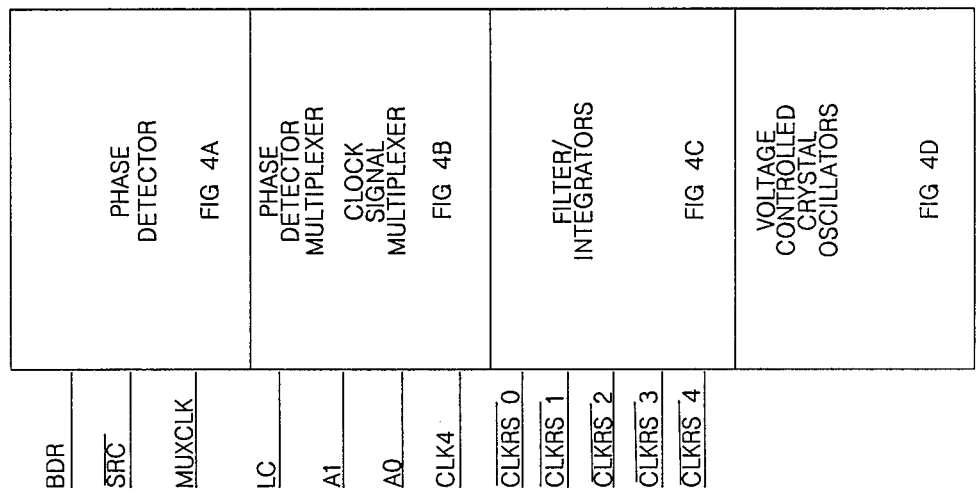

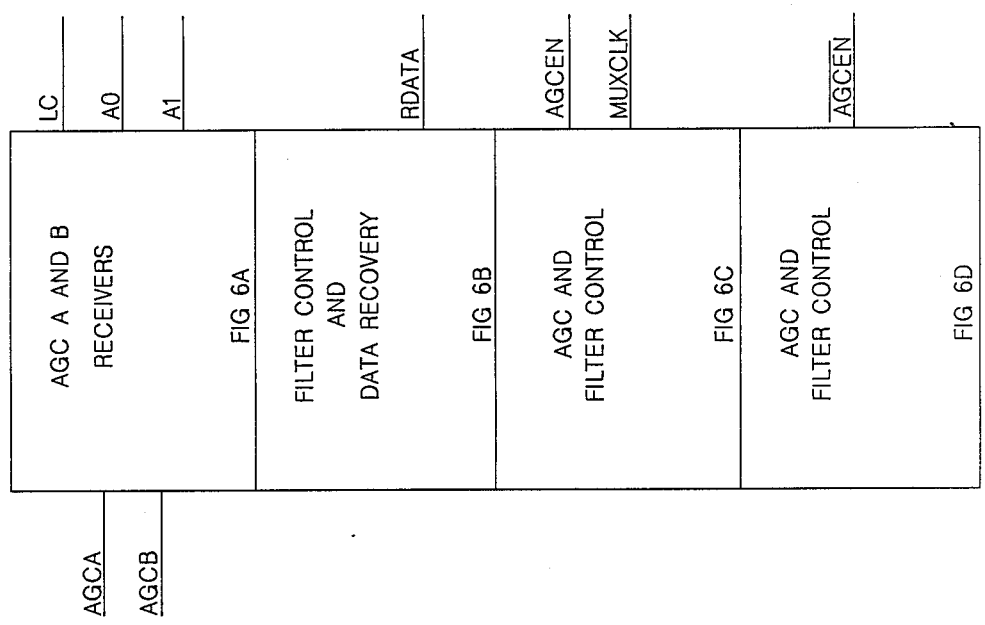

- R2 IS REPRESENTED IN THE ACTUAL CIRCUIT BY OTA U28 AND ASSOCIATED COMPONENTS
- R1, C1 SET A POLE
- R2, C2 SET A ZERO

SIGNAL REPEATER FOR MULTI SUBSCRIBER COMMUNICATION OVER SINGLE PAIR TELEPHONE LINE

FIELD OF THE INVENTION

This application pertains to signal repeaters for use in telephone communication systems. More particularly, the application pertains to a signal repeater for regenerating digitally encoded signals transmitted in bursts over a single pair telephone line to enable simultaneous communication between a telephone central office and a plurality of subscriber transmitter/receivers.

BACKGROUND OF THE INVENTION

Historically, because it is expensive to install single pair telephone lines in sparsely populated rural areas, from two to eight (and sometimes more) rural telephone subscribers have had to share the same single pair telephone line. Although the number of rural subscribers who have had to share such "multiparty" telephone lines has decreased in recent years, it has been estimated that about 5% of North American telephone subscribers still have only multiparty service.

Various analogue circuitry systems have been devised in an effort to enable from two to eight subscribers to communicate simultaneously over the same single pair telephone line without interfering with one another's communication. However, such systems are typically expensive to install and expensive to maintain. Experience has shown that the equipment must be continually adjusted to maintain acceptable performance levels, due to the drifting of carrier frequencies and the various filters which separate the high and low voice bands which make up each telephone communication channel. The lack of suitable diagnostics to assist in identifying and correcting alarm or breakdown conditions has also been problematic. Essentially, a service disruption caused by a faulty repeater located within such a system has required the system maintenance personnel to visit every signal repeater located between the telephone central office and the subscriber(s) experiencing the fault until the faulty repeater is located and repaired. This is obviously a time consuming, frustrating and costly endeavour. Moreover, telephone companies are currently attempting to upgrade their networks by phasing out analogue equipment in favour of more reliable digital equipment. Accordingly, telephone companies are not enthused about the prospect of investing in the installation of more analogue equipment.

Multiplexed digital subscriber systems have recently been developed which enable four wire communication (i.e. two wires for communication in the transmit direction and two wires for communication in the receive direction). However, such systems conventionally provide for communication with groups of six subscribers. Accordingly, such systems are not well suited to rural use, because rural telephone subscribers are not normally found in clusters of six. Moreover, because such systems would require the installation of additional cable pairs over and above the existing single cable pairs which currently service multiparty rural telephone subscribers, installation costs would increase.

Digital concentrators have also been considered to provide service to multiparty subscribers. However, digital concentrators are relatively sophisticated, expensive products best suited to situations in which a large number of subscribers are found in a concentrated area. The digital concentrator essentially serves as a local switch which reduces the number of lines required between the telephone central office and the rural telephone office at which the digital concentrator is situated. The cost factor, coupled with the fact that rural telephone subscribers are not normally found in large concentrations, renders digital concentrators unsuitable as a widespread solution to the problem of enabling simultaneous multiparty communication over existing rural single pair telephone lines.

Rural telephone subscribers are placing increasing pressure on telephone companies to provide them with telephone service equivalent to that enjoyed by urban telephone subscribers. That is, rural telephone subscribers wish to be freed of the inconveniences of multiparty service. This is particularly true of the increasing number of sophisticated rural telephone subscribers who wish to use the telephone lines for data communication purposes to assist their business endeavours. Reliable data communication over shared multiparty lines is not possible. One way of upgrading service to such subscribers would be to run dedicated single pair telephone lines to each rural subscriber as is done in urban areas. However, the cost of running a cable over an extended distance to service a relatively few subscribers cannot be justified. Moreover, rural subscribers have objected to the disruption caused by cable plowing programs. The telephone companies thus desire a solution which will allow them to upgrade service to rural customers without the installation of additional telephone lines.

The present invention is a signal repeater which may be utilized by a digital subscriber carrier system capable of allowing up to four telephone subscribers to communicate simultaneously over an existing single pair telephone line. The system thus allows telephone companies to replace dissatisfactory rural multiparty service with the desired individual line service without necessitating the installation of additional cable pairs. The system consists of a central office terminal, a subscriber terminal and the signal repeater which is the subject of the present application.

SUMMARY OF THE INVENTION

In accordance with the invention there is provided a signal repeater for regenerating digitally encoded signals transmitted in bursts over a single pair telephone line to enable simultaneous communication between a telephone central office and a plurality of subscriber transmitter/receivers. The repeater comprises signal coupling means for decoupling signals from the line for regeneration thereof by the repeater and for recoupling signals regenerated by the repeater onto the line; clock recovery means for deriving clock frequency and phase information characteristic of the decoupled signals to facilitate accurate regeneration thereof; data recovery means for decoding the decoupled signals and for regenerating the decoded signals to replicate the signals originally produced by the telephone central office and subscriber transmitter/receivers respectively; data conversion means for re-encoding the regenerated signals for recoupling thereof onto the line; and, signal processing means for controlling the operation of the signal coupling means, the clock recovery means, the data recovery means and the data conversion means.

The signal repeater further comprises signal input control means for communicating the decoupled signals to the data recovery means and for disabling such communication when the decoupling means is recoupling the regenerated signals onto the line.

The data recovery means advantageously comprises first, second, third, fourth and fifth receivers for selectively receiving the decoupled signals from the telephone central office and from each of four subscriber transmitter/receivers respectively; and, receiver selector means for selectively actuating one of the first, second, third, fourth or fifth receivers to pass decoupled signals originating from the telephone central office or from one of the subscriber transmitter/receivers.

The data recovery means preferably further comprises filter means for filtering signals passed by the receiver selector means to compensate for impedance differences in the communication path between the repeater, the telephone central office, and the subscriber transmitter/receivers as the repeater is switched sequentially for communication with the telephone central office and with each of the subscriber transmitter/re- ceivers.

The data recovery means preferably also comprises data comparator means for comparing the voltage of signals output by the filter means with a reference voltage signal and for producing a received data ("RDATA") output signal by generating a first binary signal when the voltage of signals output by the filter means exceeds the reference voltage, and by generating a second binary signal when the reference voltage exceeds the voltage of signals output by the filter means.

The signal processing means advantageously may comprise data burst detector means for detecting within the decoupled, decoded signals a signal pattern signifying the start of a data burst transmission and for thereupon initiating recovery of the data burst by the data recovery means. The signal processing means advantageously also comprises timing control means for receiving the RDATA signal and for producing a binary data received ("BDR") output signal in response thereto. The signal processing means preferably also comprises data clock multiplexer means for receiving the RDATA signal and for producing a binary data recovered ("TXDATA") signal representative thereof.

The signal processing means may further advantageously comprise signal loopback control means for detecting signal loopback commands transmitted from the telephone central office and for asserting in response thereto as the TXDATA signal the signal received by the repeater from the telephone central office.

The clock recovery means advantageously comprises a phase detector for receiving the BDR signal, for detecting therein a signal pattern signifying the start of a data burst transmission and for thereupon initiating recovery of the clock frequency and phase information characteristic of the transmission.

The clock recovery means also comprises first, second, third, fourth and fifth oscillators for maintaining clock frequency and phase information characteristic of the decoupled signals received, respectively, from the telephone central office and from each of the four subscriber transmitter/receivers. The clock recovery means further comprises first, second, third, fourth and fifth integrators for variably controlling the phase of the first, second, third, fourth and fifth oscillators respectively in response to changes in the phase of signals received from the telephone central office and from the subscriber transmitter/receivers respectively.

The transmitted signals are preferably encoded by applying thereto a modified duobinary code and are transmitted by time compression multiplexing thereof.

The signal repeater advantageously also comprises current sink/source means for selectably sinking or sourcing a small D.C. sealing current transmitted along the line.

The data conversion means preferably re-encodes the regenerated signal by applying a modified duobinary transformation to the TXDATA signal. The data conversion means preferably further applies a time compression multiplexing transformation to the TXDATA signal.

BRIEF DESCRIPTION OF THE DRAWINGS

FIG. 3 is a block diagram of the repeater transmitter ("RTX") subsection of the repeater, illustrating the five sub-subsections thereof.

FIG. 4 is a block diagram of the repeater clock recovery ("CKR") subsection of the repeater, illustrating the four sub-subsections thereof.

FIG. 6 is a block diagram of the data recover ("RDRX") subsection of the repeater, illustrating the four sub-subsections thereof.

DETAILED DESCRIPTION OF THE PREFERRED EMBODIMENT

Background

Figure 1:
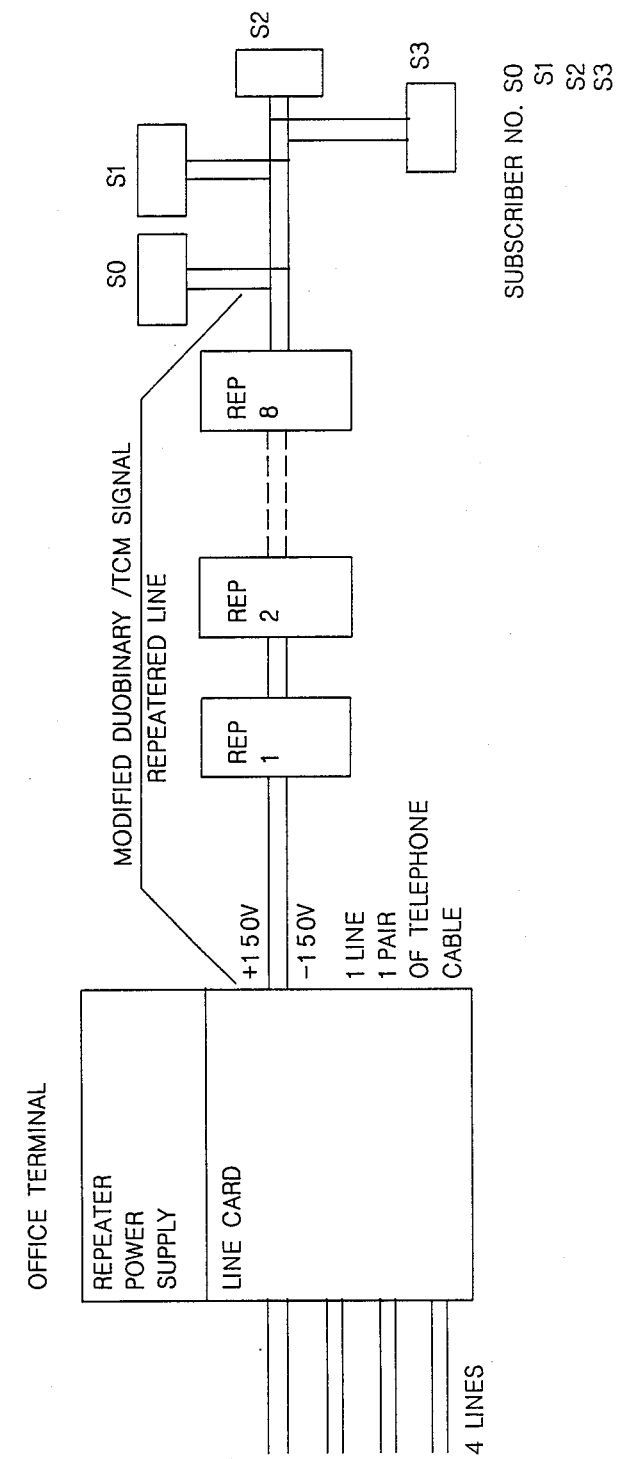
FIG. 1 is a simplified block diagram of a repeatered subscriber carrier line with four subscriber terminals.

To assist those skilled in the art in understanding the invention a brief description of the digital subscriber carrier system with which the repeater of the present invention is intended to operate will first be provided.

As previously stated, the digital subscriber carrier system consists of a central office terminal, a subscriber terminal for each subscriber and one or more line repeaters according to the present invention. The system provides four voice channels over a single pair telephone line. Each subscriber may be located up to twenty miles away from the telephone central office.

The central office terminal consists of a terminal shelf for mounting in a standard relay rack; up to eight line cards having four communications channels per card; a control module; a system power supply and a repeater power supply. There may be up to thirty-two terminal shelves, each serving thirty-two separate communications channels for a total of 1024 separate communications channels.

The subscriber terminal is normally located within the subscriber's residence and operates from 110 volt A.C. power with an internal 12 volt D.C. backup battery. Up to five standard telephones using either rotary dial or pulse tone signalling may be connected to each subscriber terminal.

The repeater of the present invention is used to regenerate digital pulses sent over the single pair telephone line which interconnects the central office and subscriber terminals. The repeaters are mounted in weather-proof housings, each of which can accomodate up to eighteen plug-in repeaters. The repeater housings are normally mounted on telephone poles or pedestals co-located with an existing loading coil location along the cable route.

The repeaters are powered from the central office terminal via the single pair telephone line. Twelve repeaters can be fed in tandem. Repeaters are normally required every 32 to 37 db. of line loss, which translates into approximately 3.5 miles if 19 gauge wire is used, 3.0 miles if 22 gauge wire is used and 2.5 miles if 24 gauge wire is used. No line conditioning is required, so loading coils installed in the previously existing multi-party service line must be removed.

A control module provided within the central office terminal monitors and stores the status of the various system components. System status information is obtained from microprocessors built into each subscriber terminal, into each central office line card and into each signal repeater. Diagnostic tests can thus be performed from a remote maintenance centre via a data terminal which is connected to the system via a standard RS-232C serial data port. A line printer can also be connected to the system. Diagnostic software can thus be designed so that a menu of possible tests and system status information is presented to the maintenance staff, with step by step prompts to aid in diagnosis of various problems. The diagnostic software can thus provide information on the status of the system, whether there is a major alarm (indicating a failure of one or more voice channels), or a minor alarm (indicating system deterioration). As well, the diagnostic software determines which channels are in use, checks their performance and data error rate, and verifies the correct operation of each repeater. To verify the operation of each repeater, a loopback command is sent to each repeater in sequence, starting with the repeater closest to the central office terminal and proceeding outwardly therefrom. The repeater receives the loopback command, and, if it is in working order, transmits a return signal indicating normal operation. Any subscriber may be disconnected from the system via a special code that the system personnel may input from the central office control module.

The system enables four full duplex (two way) voice channels to be provided simultaneously over a single pair telephone line. A subscriber line in a telephone exchange is cross-connected to a specific subscriber's line card in the digital subscriber central office terminal. When an incoming telephone call from the telephone exchange is detected by the ringing detector circuit on the central office terminal line card, the status of the channel assigned to the called party is determined. If the channel is not in use, the line card sends the appropriate supervisory signal to the subscriber terminal at the other end of the voice channel, to start ringing the subscriber's telephone. When the subscriber telephone is answered (goes off-hook) the subscriber terminal detects the change of status and sends the appropriate supervisory signal back to the central office terminal line card. The central office interface relay on the line card is activated and communication between the calling and called parties is established. When the call is completed the central office interface relay is deactivated, releasing the line. When a call is made from the subscriber's location, the operation is similar, with the dial pulses from the subscriber's telephone being faithfully repeated by the line card in the central office terminal to the telephone exchange.

The central office terminal line card buffers and converts several samples of the voice frequency signals of each incoming central office line to PCM (pulse code modulated) signals, inserts the appropriate supervisory signaling bits, and then transmits them through the assigned channel in repetitive bursts at 768 kbits/second. The associated remote subscriber terminal also converts and buffers the voice frequency signal, together with its operational status, to PCM pulses, and then transmits them to the line card in an assigned time slot after the data from the line card is received. When the line card receives the incoming PCM pulses, it converts them back to voice frequency signals and diverts them to the appropriate central office line. The operation outlined above is repeated in an endless loop.

All voice and signalling information is digitally multiplexed into a 768 kbit/second digital data stream, with full duplex operation achieved by time compression multiplexing (TCM). Packets of data are sent in each direction alternately (ping-pong technique), with the bit stream changing direction at a 667 cycle/second rate. The line bit format is modified duobinary; therefore, most of the energy is concentrated at a line frequency of 192 KHz.

The following table summarizes the system transmission characteristics.

| Transmission scheme | Time compression multiplexing |
|---|---|
| Coding Format | Precoded modified duobinary |
| Bit Rate | 768 Kb/s |
| Speech sampling rate | 8 KHz |
| Companding law | u=255 |
| Voice code | 8 bits per sample |
| Duty cycle | 100% |
| Transmit pulse amplitude | ±3 volts ±5% |
| Receive pulse amplitude | ±150 mv minimum |
| Line impedance | 100 ohms balanced at 192 KHz |

The digital subscriber carrier system can have from one to eight repeaters on a single pair telephone line between the central office terminal line card and any of four subscriber terminals. FIG. 1 is a simplified block diagram of the carrier system. The office terminal provides a ±150 volt power source to the line, which is current regulated to 100 ma., to power up to 12 repeaters ("REP 1", "REP 2", etc.) in tandem.

In the digital carrier system, the office line card and each subscriber terminal ("50", "51", "52" and "53") transmit a modified duobinary signal at 768 K bits per second in repetitive data bursts at a rate of 667 cycles per second over the cable pair. The line card and subscriber terminal can communicate (without any repeaters) over a maximum distance of between two to three miles, depending on the gauge of wire used. The present invention facilitates increased spacing of up to twenty miles between the central office terminal and the subscriber terminals, by cascading up to eight repeaters in sequence.

Signal Repeater—Basic

The signal repeater of the present invention receives the data bursts, recovers the original binary data and retransmits it as originally sent. The duration of one cycle is 1.5 milliseconds for the line card to transmit four bursts of data, one for each subscriber terminal, and for each of the four subscriber terminals in turn to transmit one burst of data in the return direction. The repeater regenerates signals alternately in each direction to allow the line card and subscriber terminal to communicate.

Line repeaters are spaced at predetermined intervals on the cable pair between the central office and subscriber terminals. The number of repeaters per system will depend on the length and gauge of the cable pair. The repeaters are designed to operate over any standard grade telephone cable of 19, 22 or 24 gauge AWG plastic or paper insulated cable. The system operates over a distance of up to twenty miles via one pair of nonloaded telephone cable.

Figure 2:
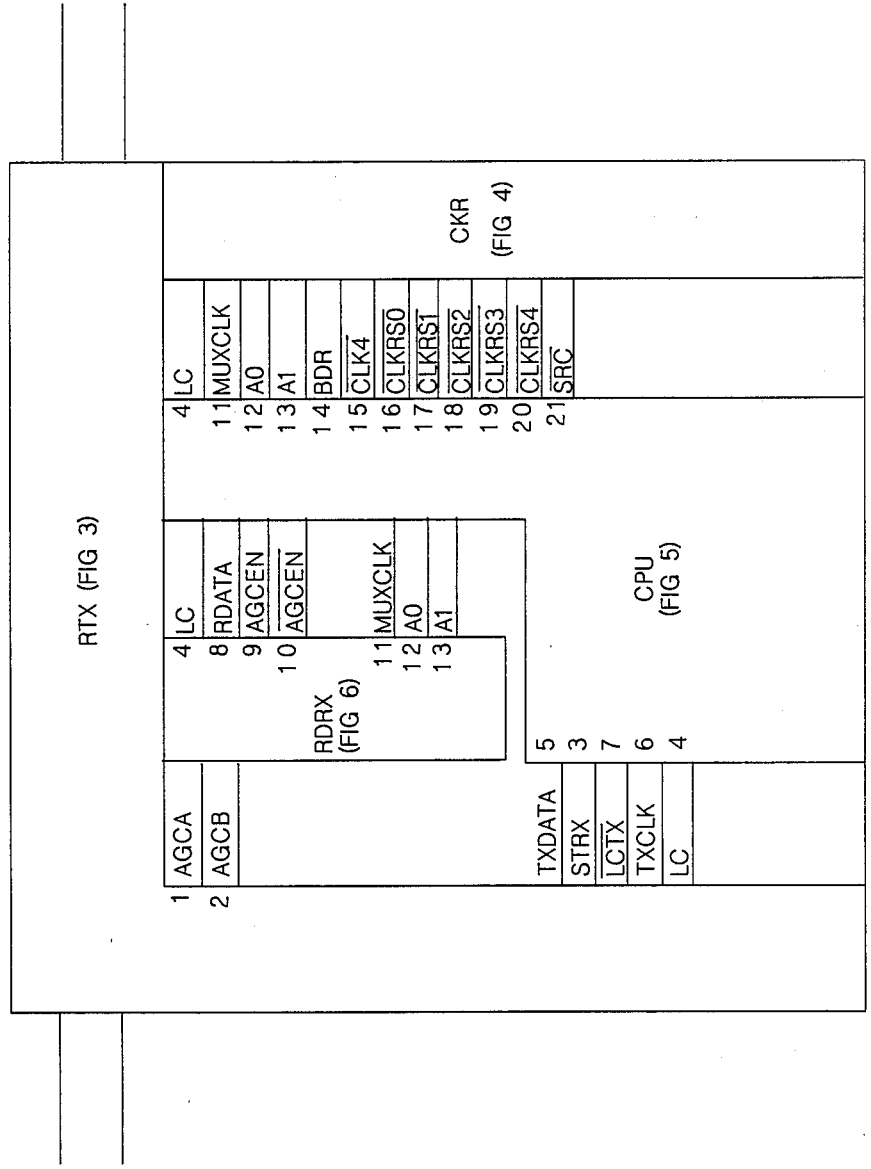
FIG. 2 is a block diagram of the signal repeater of the present invention illustrating the four major subsections thereof and the signals used to communicate between those subsections in controlling the operation of the repeater.

As illustrated in FIG. 2, the signal repeater of the present invention comprises four subsections as follows:
(1) the repeater transmitter subsection ("RTX")
(2) the repeater data recovery subsection ("RDRX")
(3) the clock recovery subsection ("CKR")
(4) the microprocessor subsection ("CPU")
There are five transmission signal paths and sixteen control signals between the four subsections for a total of twenty-one signals. The repeater is microprocessor controlled.

The following table lists the 21 communication signals identified in FIG. 2. These signals will be discussed in detail throughout the technical description of the operation of the repeater.

| 1 | AGC A | receive signal bursts from the central office terminal |
|---|---|---|
| 2 | AGC B | receive signal bursts fro the subscriber terminals |
| 3 | STRX | repeater receiver enable control signal |
| 4 | LC | line card burst being processed signal |
| 5 | TX DATA | binary data recovered input to the repeater transmitter |
| 6 | TX CLK | transmit clock signal |
| 7 | LCTX | line card transmit signal |
| 8 | R DATA | received data |
| 9 | AGC EN | automatic gain control enable - high |
| 10 | AGC EN' | automatic gain control enable - low |
| 11 | MUX CLK | time multiplexed clock based on LC A0 & A1 |
| 12 | A0 | subscriber terminal number select line |
| 13 | A1 | subscriber terminal number select line |
| 14 | BDR | binary data received |
| 15 | CLK 4' | line card clock |
| 16 | CLK RS0' | subscriber terminal 0 clock reset |
| 17 | CLK RS1' | subscriber terminal 1 clock reset |
| 18 | CLK RS2' | subscriber terminal 2 clock reset |
| 19 | CLK RS3' | subscriber terminal 3 clock reset |
| 20 | CLK RS4' | line card clock reset |
| 21 | SRC' | shift register clear |

Note that an apostrophe is used to indicate signals transmitted in the binary low condition, whereas the more conventional superimposed bar notation is used to indicate such signals in the drawings.

Brief Overview of Repeater Operation

The RTX subsection couples the single pair telephone line to the repeater and provides receive data burst outputs AGC A and AGC B (signals 1 and 2)

under control of microprocessor signals STRX and LC (signals 3 and 4). The RTX transmitter accepts the TXDATA (signal 5) of recovered binary data, from the microprocessor controlled output, and converts it to a modified duobinary signal. The TXCLK (signal 6) signal from the microprocessor is required to synchronize the data conversion. Under microprocessor control of signals STRX and LCTX' (signals 3 and 7) the transmitter establishes the time compression multiplex signals and data bursts to the telephone line for interfacing the line card and alternately to the cable for interfacing the four subscriber terminals. The RTX section also contains the repeater power supplies, providing ±5 volts for all the electronic circuit requirements and a sink-/source sealing current circuit option for the cable requirements.

In outside plant telephone cables a small D.C. current is normally applied to each section of cable between repeaters and between repeaters and subscriber telephone installations to minimize effects of corrosion on the cables. This is referred to as a "sealing current". In the present system, the D.C. power would not normally pass the last repeater because the subscriber terminal is powered locally. Therefore, the repeater is designed to include an optional circuit to either sink or source a minimal D.C. current. The subscriber terminal also provides a sink or source option for D.C. sealing current.

The RDRX subsection receives AGC A and AGC B data burst inputs (signals 1 and 2) from the RTX subsection and with the aid of microprocessor timing controls recreates binary data RDATA (signal 8). Microprocessor timing controls include: AGCEN high, and AGCEN' low (signals 9 and 10); multiplexed clock MUXCLK (signal 11); line card burst being processed signal I,C (signal 4) and subscriber terminal number select lines A0 and A1 (signals 12 and 13). Refer to Table A below for definition of lines A0 and A1. The RDATA signal is for input to the CPU.

The clock recovery CKR subsection of the repeater accepts the binary data received ("BDR" signal 14), through microprocessor control of RDATA input from the RDRX section. The CKR subsection also establishes and maintains clock frequency and phase signals for each of the five data bursts, one for the line card and one for each of the four subscribers. The multiplexed clock signal originates in the CKR subsection under microprocessor control.

The microprocessor (CPU) subsection of the repeater establishes and maintains complete timing control of the major electronic circuits utilized in the repeater. The CPU control of the basic functions include: data burst recovery (AGCA and AGCB) and transmitting (TXDATA); AGC receive signal and filter multiplexing to recover the individual channel binary data TXDATA; phase detector multiplexing to voltage controlled crystal oscillator to establish precise individual clock frequency and phase data, CLK0, CLK1, CLK2, CLK3, CLK4; a multiplexed clock signal (MUXCLK) to decode the respective channel data; and the selection of data bursts being processed, signals LC, A0 and A1.

The repeater of the present invention has been designed to utilize a single circuit per function wherever possible. The five separate data bursts (one from each of the four subscriber terminals and one from the line card) are multiplexed in sequence through each circuit. In a few cases, five sets of identical circuits are required to establish a specific burst signal and these are subsequently multiplexed to a single function circuit. The microprocessor provides the timing and control functions as required for each multiplexer.

The repeater circuitry is contained on one printed circuit board which mounts in a weather proof housing, pole or pedestal mounted, with a cable stub to connect to the buried or aerial telephone cable. Mechanical connectors are screwed on to the cable stub leads and press on over the repeater card connector pins.

RTX SUBSECTION

As FIG. 3 illustrates, the repeater transmitter (RTX) subsection, consists of five sub-subsections: line coupling; automatic gain control (AGC) input control; line sink/source current control; power supply; and transmitter. These are each described separately.

Line Coupling Sub-Subsection

The line coupling sub-subsection provides: transient line protection; A.C. coupling; D.C. path for power input; D.C. blocking for the transmitter winding, receive line input for data to be recovered, and line output of recovered data.

There are two sets of line coupling elements, one for the repeater line interface towards the subscriber terminals and one for the interface towards the office terminal line card. These together serve as a "signal coupling means" for decoupling signals from the line for regeneration thereof by the repeater and for recoupling signals regenerated by the repeater back onto the line. Since operation is identical, only one set of line coupling elements is described with reference to FIG. 3A which illustrates the line coupling towards the subscriber terminals. The subscriber terminal side consists of gas tube S2, metal oxide varistor MOV2, capacitors C11, CD1, CD2 and transformer T1 with a turns ratio of 1:1 to 4:8. Transient line voltage protection is provided by S2 which fires at 350 to 500 volts and MOV2 rated at 430 volts. T1 provides for A.C. coupling of the signal and a D.C. path for power input. C11 is the D.C. blocking capacitor. Transformer T1 pins 1 and 5 are the receive windings, with incoming subscriber terminal data to be recovered, and pins 2 and 3 are the re-transmit winding with outgoing recovered line card data. Capacitors CD1 and CD2 are the D.C. blocking capacitors for the transmitter winding. The line coupling towards the office terminal line card may be seen in FIG. 3D. It will be noted that all of the electronic circuit schematic diagrams included in the drawings incorporate electronic component part designations and values for each of the electronic components utilized in the preferred embodiment.

Transmitter Sub-Subsection

The transmitter accepts the regenerated data stream and converts it to a modified duobinary TCM signal for transmission on the cable in either the subscriber terminal or line card direction, thus providing a "data conversion means" for re-encoding the signals regenerated by the repeater before they are recoupled back onto the line.

Figure 3A:
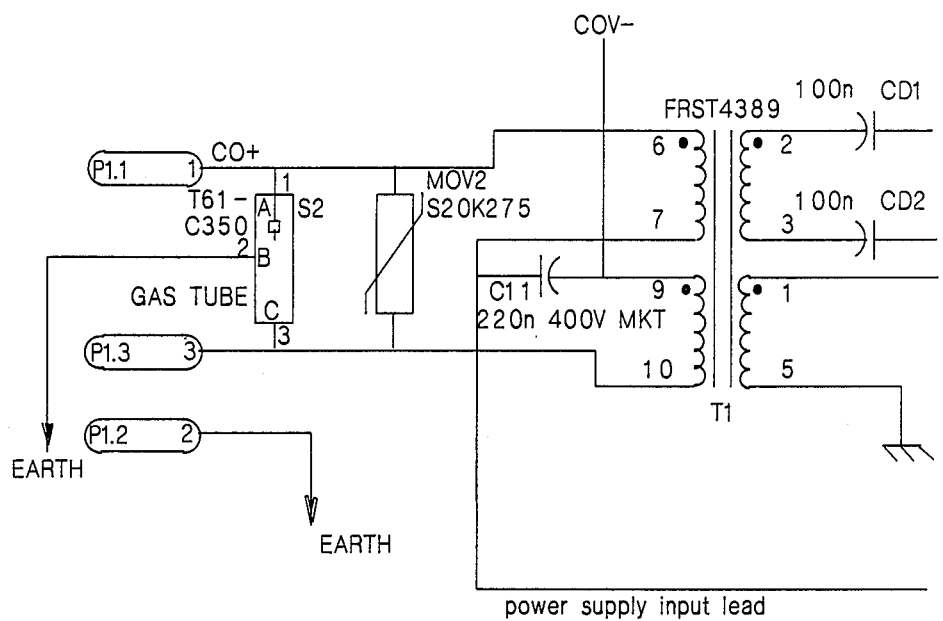
FIG. 3A is an electronic circuit schematic diagram of the line coupling sub-subsection of the repeater transmitter subsection.
Figure 3B:
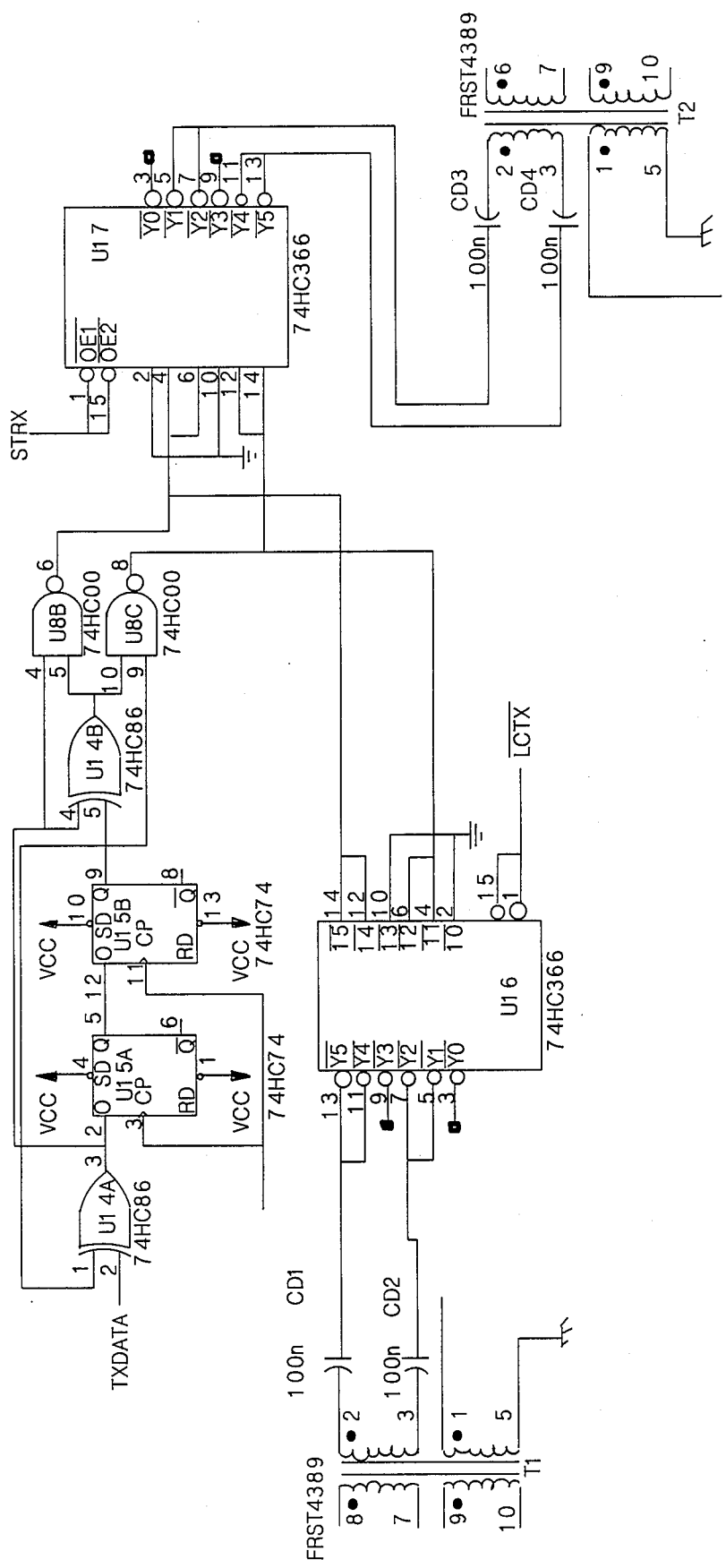
FIG. 3B is an electronic circuit schematic diagram of the transmitter sub-subsection of the repeater transmitter subsection.
Figure 5:
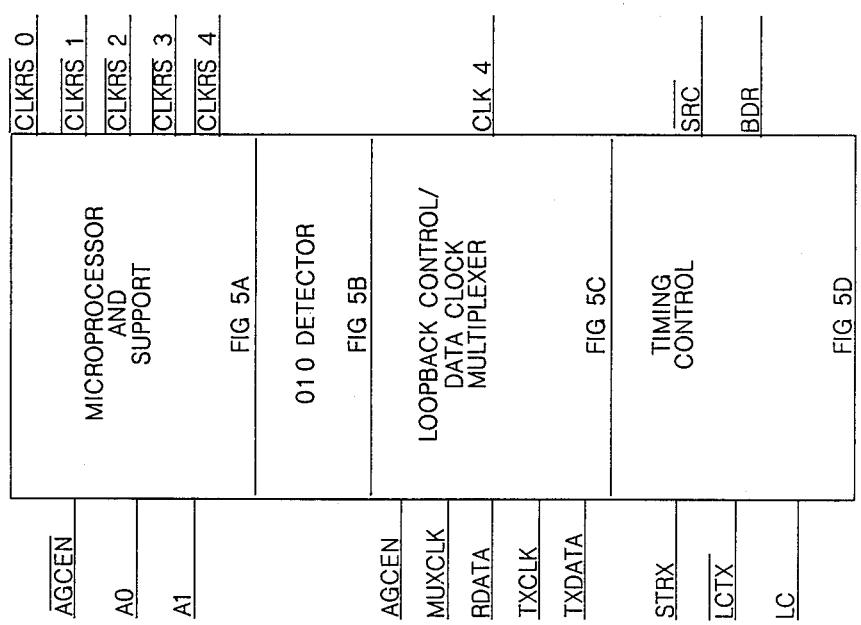
FIG. 5 is a block diagram of the microprocessor ("CPU") subsection of the repeater, illustrating the four sub-subsections thereof.
Figure 5A:
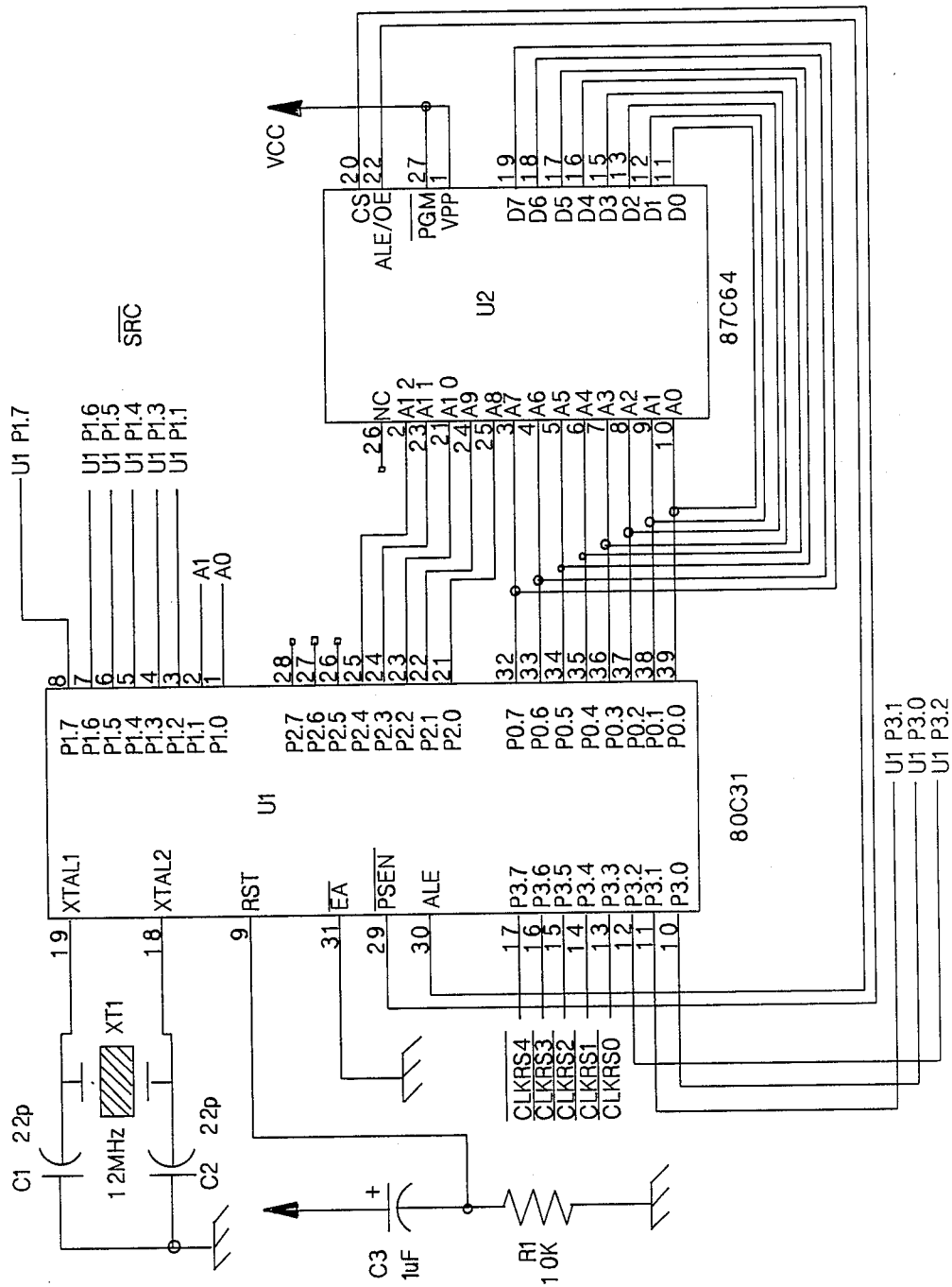
FIG. 5A is an electronic circuit schematic diagram of the microprocessor and support sub-subsection of the repeater microprocessor subsection.
Figure 5B:
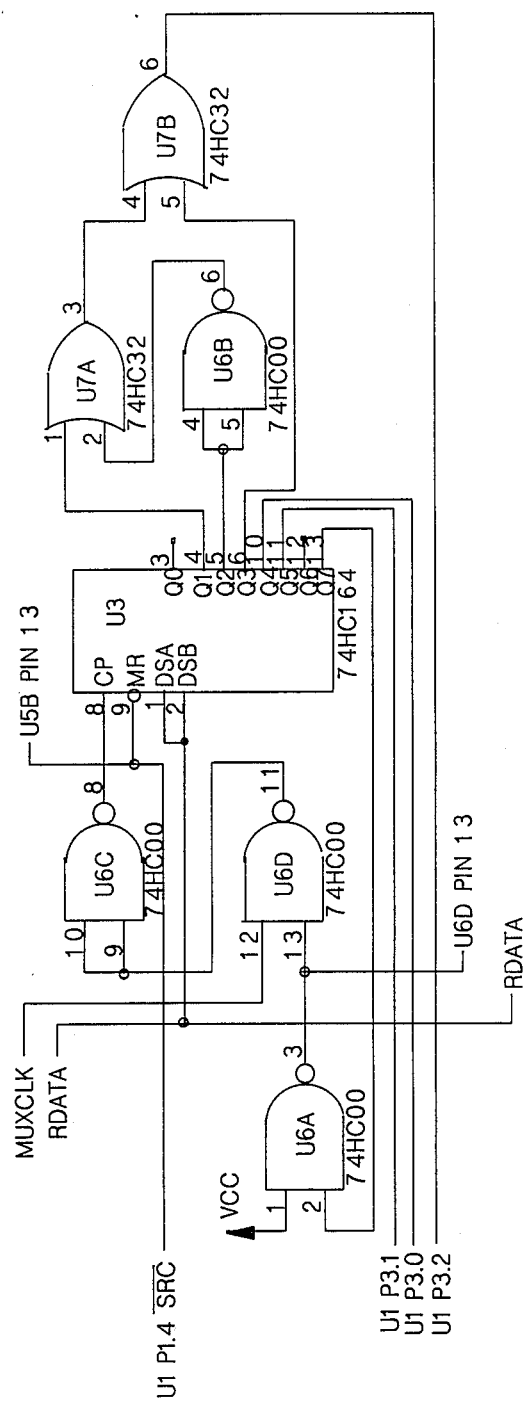
FIG. 5B is an electronic circuit schematic diagram of the 010 detector sub-subsection of the repeater microprocessor subsection.
Figure 5C:
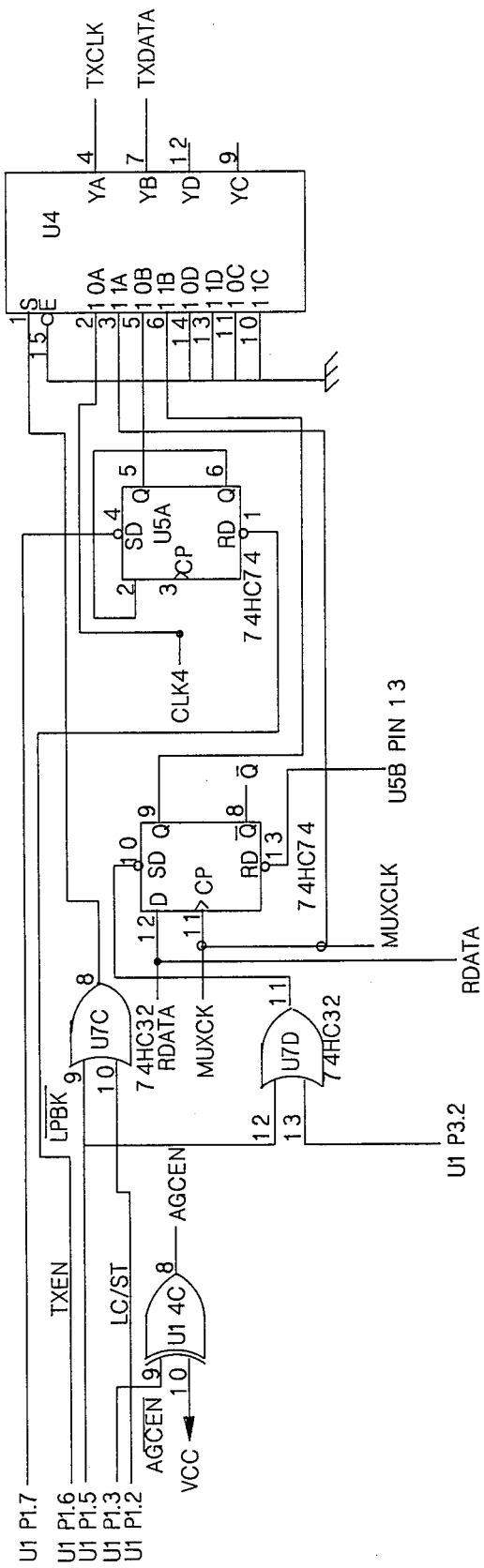
FIG. 5C is an electronic circuit schematic diagram of the loopback control/data clock multiplexer sub-subsection of the repeater microprocessor subsec- tion.

As illustrated in FIG. 3B and in part of FIG. 5C, the transmitter consists of:
— 3 flip-flops U5B, U15A, U15B
— 2 exclusive OR gates U14A, U14B
— 2 NAND gates U8B, U8C
— 2 drivers U16, U17
— 1 multiplexer U4
(Note: U5B and U4 are shown in FIG. 5C)

The digital data ("RDATA") is fed into flip-flop U5B, which ensures that the data will be exactly synchronous with the clock. The output of U5B is then fed through multiplexer U4 (explained later) to one of the inputs of an exlusive OR (X-OR) gate U14A. The second input of this X-OR gate is its ouput delayed by two clock cycles. The output of U14A feeds the input of flip-flop U15A. The output of U15A feeds the input of flip-flop U15B. U15A and U15B each delay the output of X-OR gate U14A by one clock cycle, as each are clocked by the system clock (through input TXCLK, explained later). Thus a total of two clock cycles delay is obtained. The delayed and non-delayed U14A X-OR gate outputs are then fed into a second X-OR gate U14B. The output of this second X-OR gate goes into one input of each of two NAND gates, U8B and U8C to serve as an enable signal for the NAND gates. An output from the first X-OR gate is fed to NAND gate U8B, and the two cycle delayed output goes to the other NAND gate U8C. Each NAND gate output goes to inputs of line drivers U16 for the line card transmit path direction and U17 for the subscriber terminal direction. The output of the U16 driver goes to pins 2 and 3 of center tapped transformer T1. The output of U17 goes to pins 2 and 3 of transformer T2. The center tap of each transformer is tied low. This transformer configuration performs a subtracting function, so the output is a ternary signal. The second X-OR is used because the transformer cannot cancel two high signals perfectly, so the second X-OR disables the output when the delayed and non-delayed signals are the same.

The ternary signal output thus obtained is a modified duobinary signal. The U16 and U17 drivers are microprocessor controlled by signals LCTX' and STRX respectively to establish the time compression multiplex signals of the modified duobinary data system utilized in the preferred embodiment.

Automatic Gain Control Input Control Sub-Subsection

This sub-subsection provides received data signals from each (A and B) direction to the receiver and provides an input switch under microprocessor control to disconnect the receiver when the transmitter is active for each direction; thereby constituting a "signal input control means" for communicating signals decoupled from the line to the data recovery means (described hereinafter) and for disabling such communication when the signal coupling means is recoupling signals regenerated by the repeater back onto the line.

There are 2 sets of AGC input controls, one for the signal received from the subscriber terminals and one for the signal received from the office line card. Since their construction and operation is identical, only the subscriber terminal AGC input control is explained in detail.

Figure 3C:
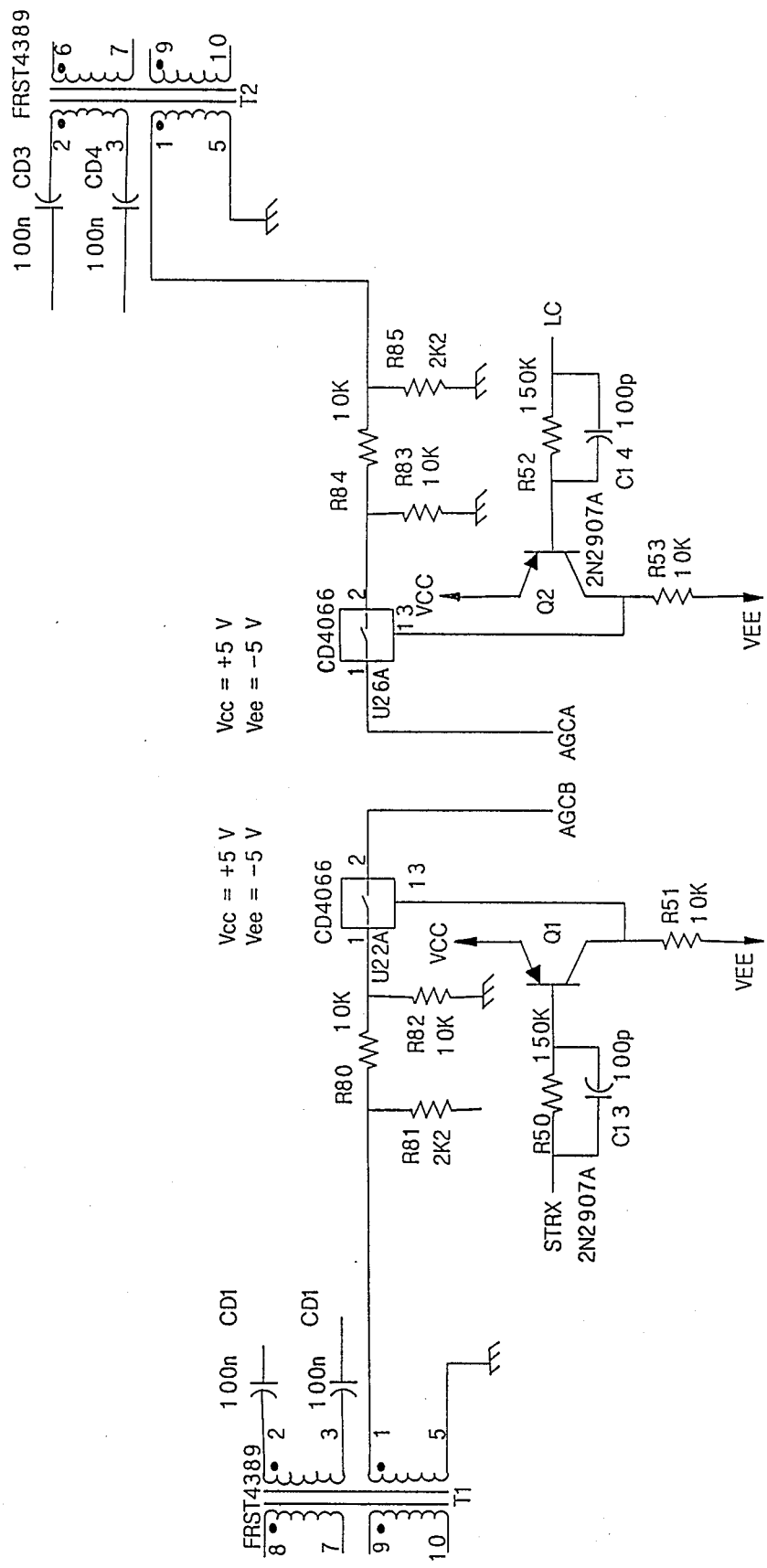
FIG. 3C is an electronic circuit schematic diagram of the AGC input control sub-subsection of the repeater transmitter subsection.

As illustrated in FIG. 3C, the AGC input control elements are R80, R81, R82, U22A, Q1, RS1, R50 and C13. Resistors R80, R81 and R82 provide input signal attenuation of 14 db. Input switch U22A is used to disconnect the receiver when the transmitter is active. Switch U22A (which handles bipolar signals) has its supply pins tied to −5 V and +5 V and has a bipolar control pin 13. U22A provides 43 db. of isolation when in the off state. Resistor R50 and capacitor C13 couple the receiver control signal STRX to transistor Q1. (C13 is a speed up capacitor which enhances switching time). Q1 performs the necessary level translation for analogue switch U22A. (STRX=0 to +5 V, pin 13 of U22A −5 V to +5 V).

Current Sink/Source Control Sub-Subsection

The current sink/source control sub-subsection controls the sealing current applied to the cables and provides a current regulator and jumper option for selecting either the source mode or the sink mode.

Figure 3D:
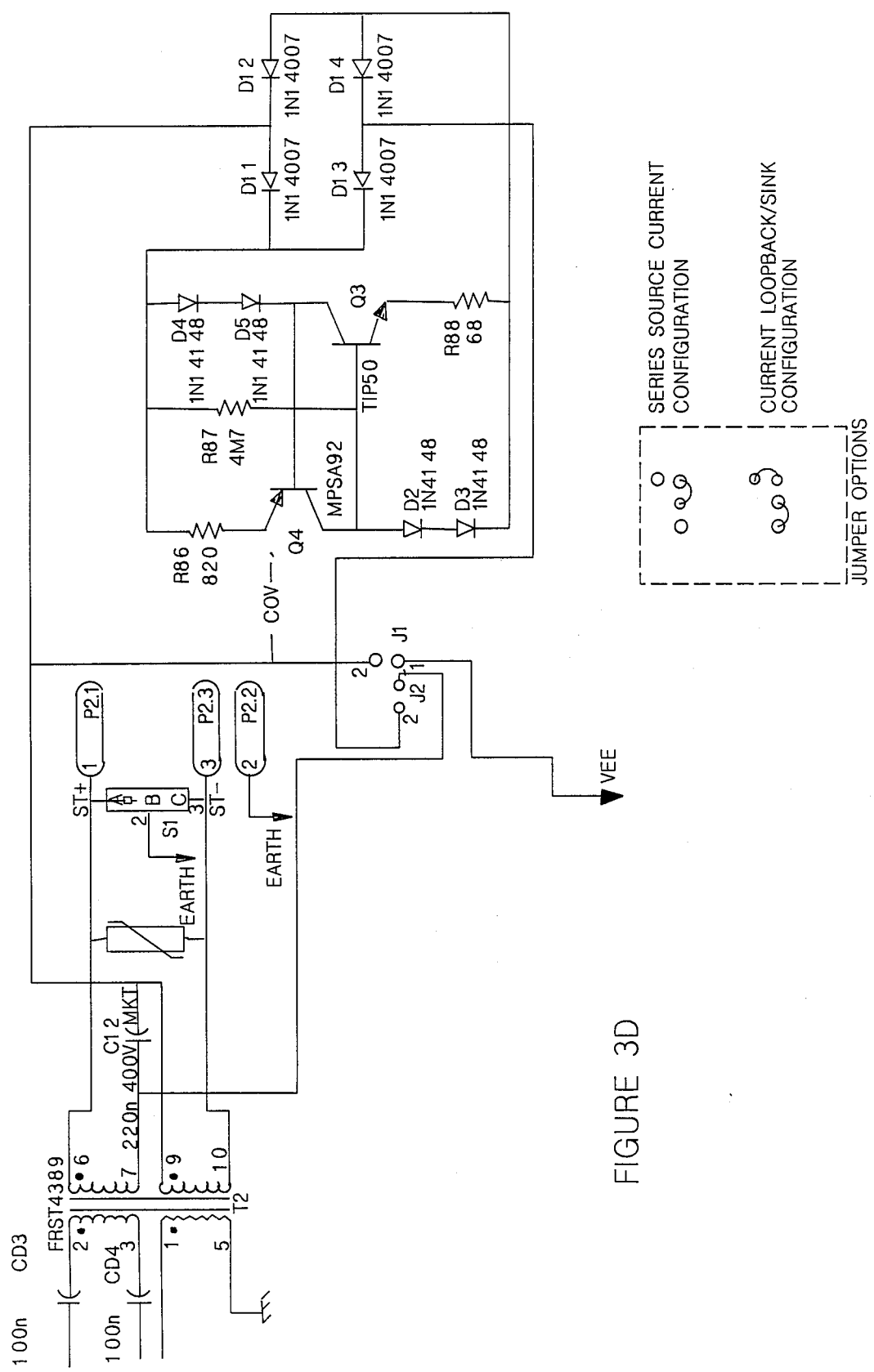
FIG. 3D is an electronic circuit schematic diagram of the line sink/source current control sub-subsection of the repeater transmitter subsection.

As illustrated in FIG. 3D, the current sink/source control consists of elements D1, D2, D3, D4, D5, D11, D12, D13, D14, R86, R87, R88, Q4, Q3, J1, J2, and the power supply (described below). Diodes D11 through D14 provide polarity protection for the current regulator. D2 and D3 provide a reference voltage for the base of transistor Q3 and, in conjunction with resistor R88, program the amount of current to be sinked or sourced. D4 and D5 provide a reference voltage for transistor Q4 which, in conjunction with R86, is used to develop a reference for transistor Q3 required for stability. R87 provides the initial bias current to start the operation of the regulator. Jumper J1 is used to set the current regulator to either source mode or sink mode as shown. The power supply is inserted in series with the current regulator and drops 10 volts.

This sub-subsection thus provides a "current sink/source means" for selectably sinking or sourcing a small D.C. sealing current transmitted along the line.

Power Supply Sub-Subsection

Figure 3E:
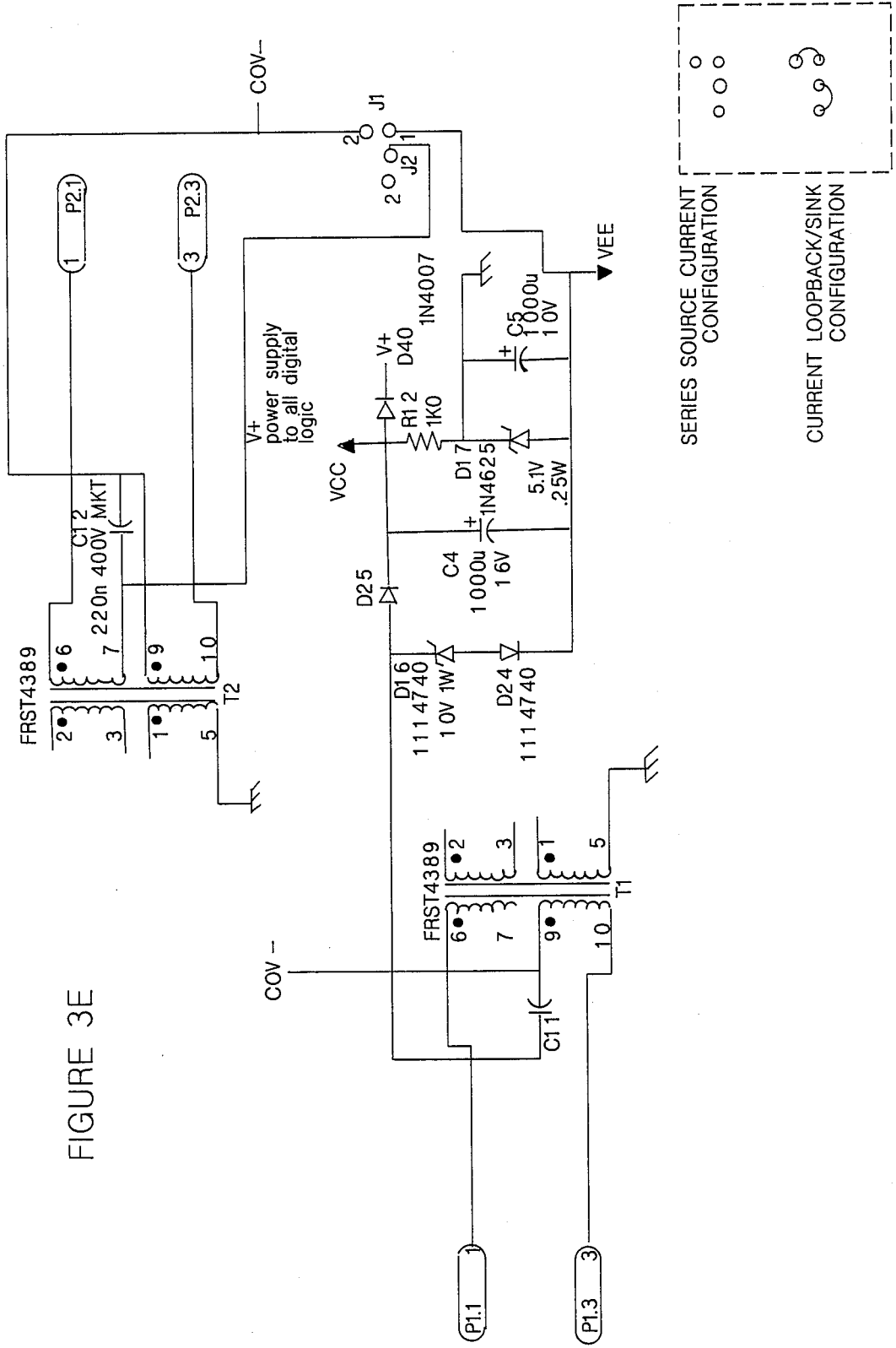
FIG. 3E is an electronic circuit schematic diagram of the power supply sub-subsection of the repeater transmitter subsection.

As illustrated in FIG. 3E, the power supply consists of elements D16, D17, D24, D25, D40, C4, C5, R12 and the current regulator (discussed in the preceding section). The power supply develops plus 5 volt and minus 5 volt sources for the line repeater circuitry from the ±150 volt line voltage placed across the telephone line pair at the central office terminal. The potential drop across the voltage regulator is 10.7 volts at a constant current of 100 ma. (as set by the current regulator). D16 sets the span of the voltage regulator to 10 volts and capacitor C4 filters this voltage. D17 and R12 are used to place the ground of the system at 5.1 volts above the low end of the voltage developed across D16/C4. Capacitor C5 filters the −5 volt supply available at point VEE. +5 volts is available at point VCC. An additional positive voltage V+ is developed through diode D40 which provides a 0.7 volt drop from VCC. This reduced voltage is used to power the digital circuitry sections of the repeater to minimize power consumption. D24 and D25 provide polarity protection for the regulator.

CKR SUBSECTION

As FIG. 4 illustrates, the clock recovery ("CKR") subsection is divided into four subsections: phase detector, multiplexers, low pass filters and voltage controlled crystal oscillators. A brief overview of the operation of the CKR subsection is first provided, followed by a separate detailed description of each of the four sub-subsections.

The CKR subsection receives the binary data "BDR" signal from the CPU subsection (the signal originates as the RDATA signal in the RDRX subsection described later). The BDR input is fed to a clock recovery phase detector circuit which is multiplexed to five filter/integrator voltage controlled crystal oscillator circuits to establish and maintain individual clock frequency and phase. The five clock frequency/phase signals feed into a clock multiplexer, under CPU control, to provide a multiplexed clock signal, "MUXCLK". The MUXCLK signal is used to decode the data bursts into binary data. The CKR subsection thus serves as a "clock recovery means" for deriving clock frequency and phase information characteristic of the signals which are decoupled from the line in order to facilitate subsequent accurate regeneration of those signals by the repeater.

Phase Detector Sub-Subsection

The phase detector detects the start bit sequence which consists of a 3 bit "010" pattern trans mitted at the beginning of each burst of data. There are up to 5 data transmission bursts, one from the line card, and up to four from the four subscriber terminals, each at the same clock frequency, but each with a different phase.

Figure 4A:
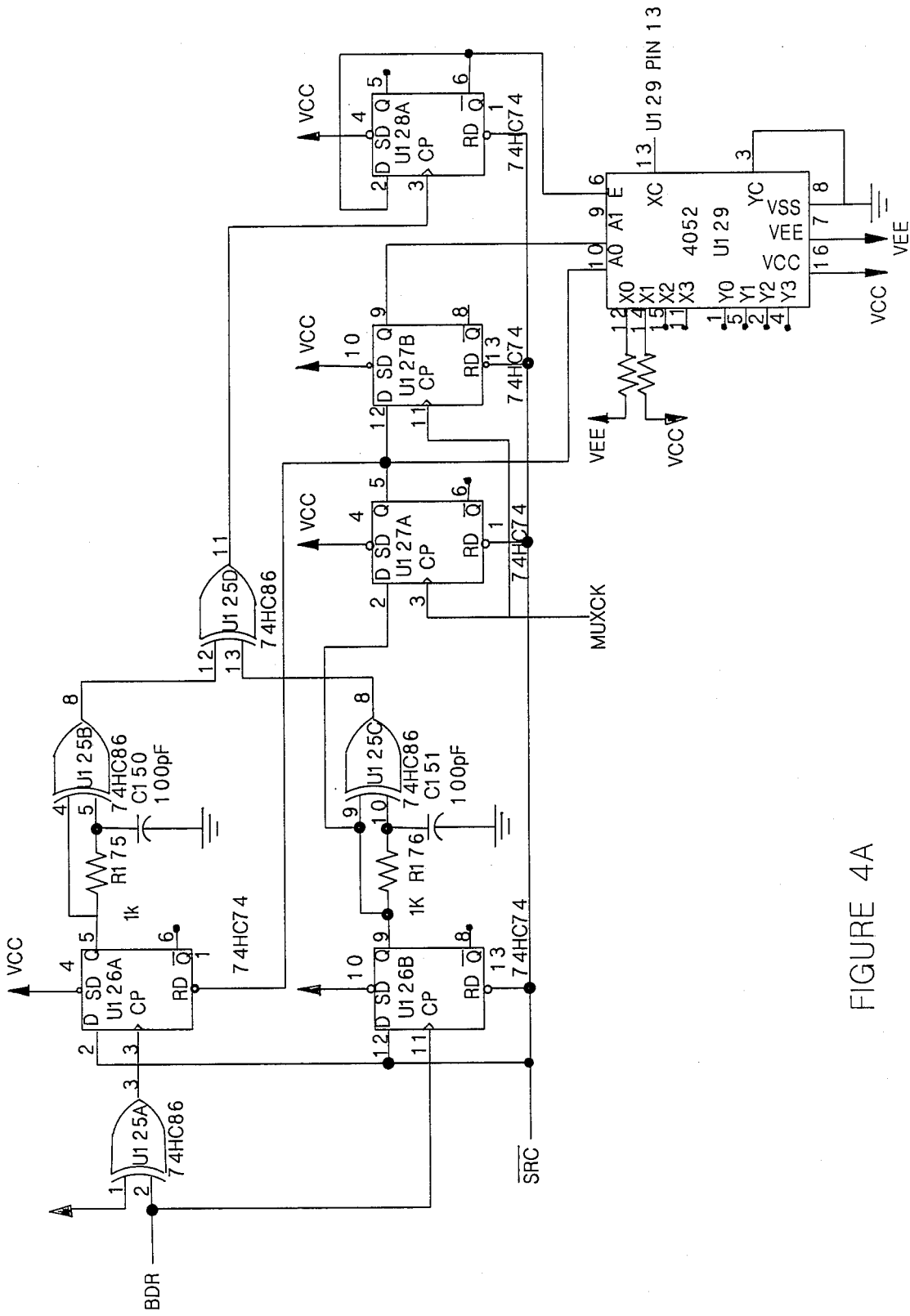
FIG. 4A is an electronic circuit schematic diagram of the phase detector sub-subsection of the repeater clock recovery subsection.

As illustrated in FIG. 4A, the phase detector consists of elements U125A, U125B, U125C, U125D, U126A, U126B, U127A, U127B, U128A, U129, R173, R174, R175, R176 C150 and C151.

Signal Definitions

BDR—binary received data - input from the CPU schematic (FIG. 5D)
SRC'—shift register clear - input from the CPU schematic (FIG. 5A)
MUXCLK—multiplex recovered clock The initial condition is that all five flip-flops are cleared by the microprocessor signal SRC'. BDR is fed to the clock input of U126B and through exclusive or gate U125A (wired as an inverter) to the clock input of U126A. On the rising edge of BDR, U126B's Q output goes high, which causes a positive going pulse to be generated by U125C (wired as a monostable using R176 and C151). This pulse is fed to exclusive or gate U125D which replicates the pulse and feeds it to the clock input of U128A, causing U128A's Q output to go low. The significance of this output going low is that the leading edge of a start bit was detected. The output of U128A feeds the enable ("E") input of multiplexer U129. When that enable goes low, the inputs selected by A0 and A1 are transferred to the outputs. (Note that only the "x" section of integrated circuit U129 is used). The A0 and A1 inputs are in the 0 state (as a result of the system being cleared); hence the voltage appearing at the x0 input is propagated to the xc pin. This voltage is VEE (−5 V) fed through R173. The start bit detected signal (U126B Q going high) provides the enable signal for the U127A and U127B shift register by setting the D input of U127A high. On the next positive going clock pulse (from MUXCLK) the output of U127A will go high.

When U127A's Q output goes high it does two things. First, it selects the X1 input on multiplexer U129 (AO=1). Secondly, it enables U127B (D=1) When A0 goes high, VCC (+5 V) through R174 propagates through multiplexor U129; this causes a step change in voltage from −5 V to +5 V. At this point, depending on the phase information of BDR and MUXCK, two situations can arise; either the clock information in BDR leads, or lags the recovered clock (MUXCLK).

When the clock information in BDR leads the recovered clock (MUXCLK), the falling edge of BDR is inverted by U125A and presented to U126A's clock input. This in turn causes the Q output to go high. U1256A's Q going high causes a positive going pulse to be generated by U125B (wired as a monostable using R175 and C150). The pulse generated by U125B is replicated by U125D and provides the clock input to U128A. Recall that the Q output of U128A was in a 0 state (enabling multiplexer U129). The next clock pulse causes the Q output to revert to the 1 state. When U128A's Q' pin goes high, the E' input of the multiplexer is also driven high. This turns multiplexer U129 off and de-selects all inputs. XC floats. At this time, one cycle of the phase detector is complete and any further transitions of BDR are ignored until the microprocessor clears the flip-flops by asserting SRC'.

When the clock information in BDR lags the recovered clock (MUXCLK), the next rising edge of MUXCLK causes U127B's Q output to go high. When U127B's output goes high, it causes multiplexer U129 to select the A1 inputs. When A1=1, either the X2 or X3 inputs are selected, depending on A0. Note that the X2 and X3 inputs are left unconnected. This achieves the same result as if the E' pin were asserted, i.e. XC floats.

It will thus be understood that the phase detector monitors the BDR signal for the presence therein of a signal pattern signifying the start of a data burst transmission and thereupon initiates recovery of the clock frequency and phase information characteristic of that transmission.

Multiplexers Sub-Subsection

Figure 4B:
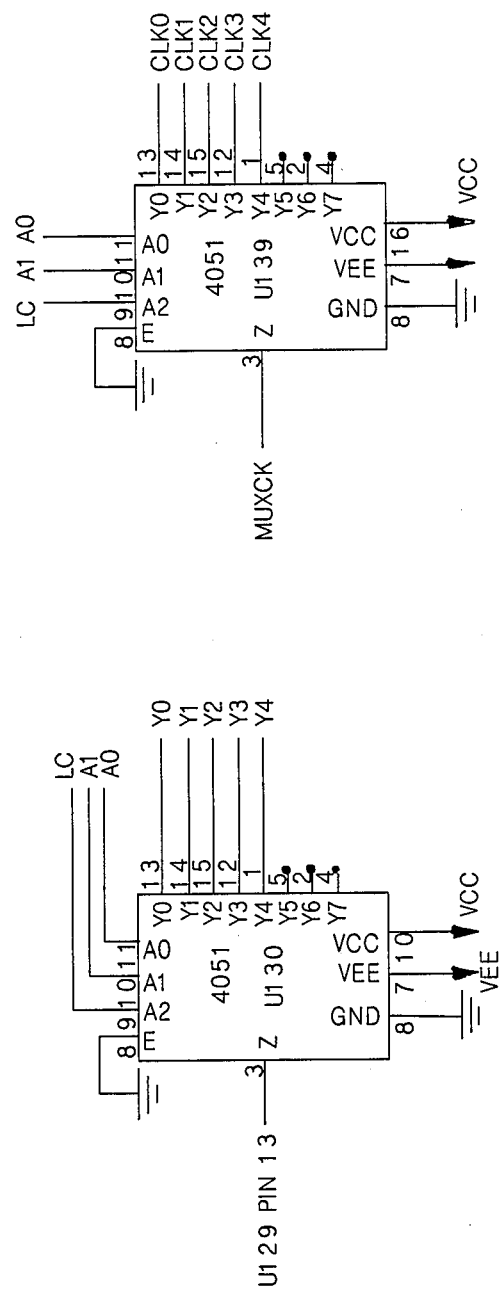
FIG. 4B is an electronic circuit schematic diagram of the phase detector multiplexer and clock signal multiplexer sub-subsection of the repeater clock recovery subsection.

Multiplexing occurs in two places, at the phase detector, and at the clocks. The two multiplexers consist of U130 and U139 (FIG. 4B). The output from the phase detector (U129 pin 13) feeds U130 pin 3. Depending on which burst is being processed (as determined by LC, A1, and A0) the phase detector output is fed to one of the five integrators (described hereinafter) via Y0, Y1, Y2, Y3, Y4.

Figure 4C:
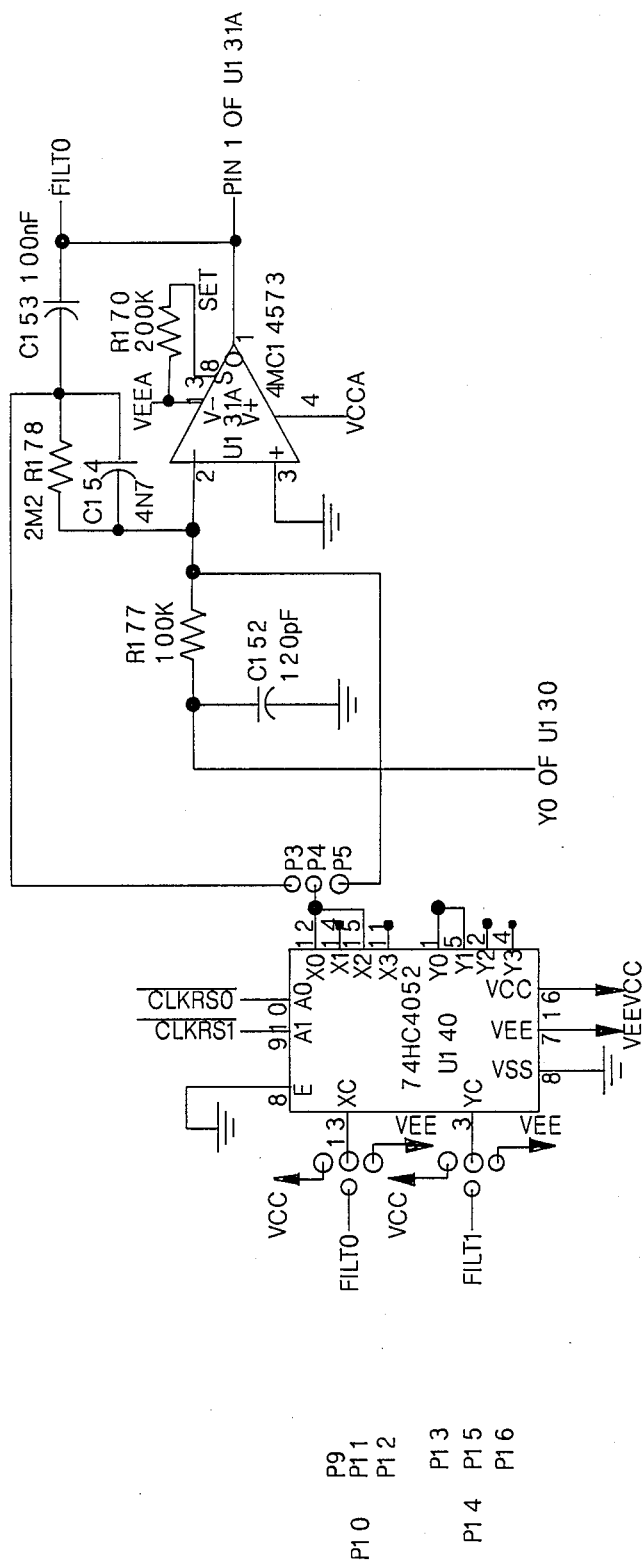
FIG. 4C is an electronic circuit schematic diagram of the filter integrators sub-subsection of the repeater clock recovery subsection.
Figure 4D:
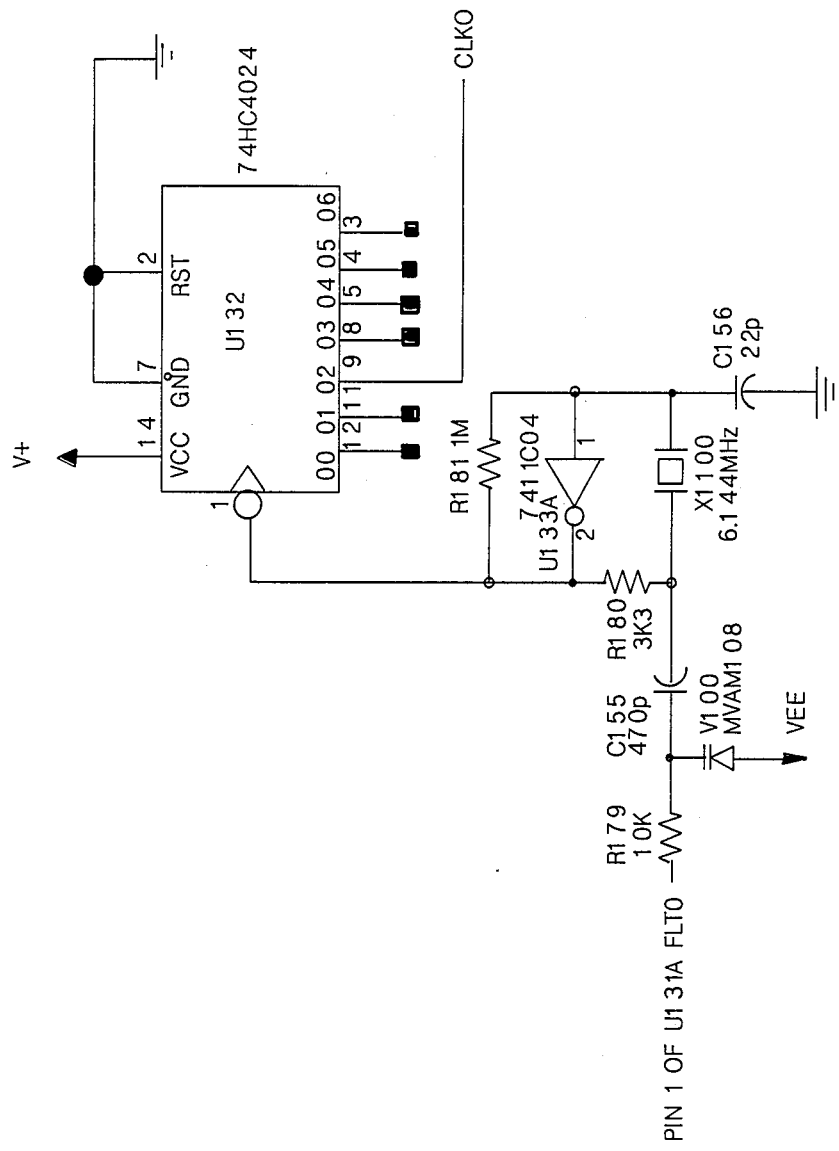
FIG. 4D is an electronic circuit schematic diagram of the voltage controlled crystal oscillators sub-subsection of the repeater clock recovery subsec- tion.

The inputs to the clock multiplexer are the 5 individual clock frequency/phase signals and the output is a multiplex clock ("MUXCLK") signal. Clock outputs are as shown in FIG. 4D discussed later. Again, depending on which burst is being processed (as determined by LC, A1, and A0) one of the five clocks is used to recover the data.

Table A set forth below defines the signals utilized by the multiplexer sub-subsection:

TABLE A

| | | | |
|---|---|---|---|
| LC | line card burst being processed | | |
| A0, A1 | subscriber terminal select lines: | | |
| | A1 | A0 | Subscriber Terminal Number |
| | 0 | 0 | 0 |
| | 0 | 1 | 1 |
| | 1 | 0 | 2 |
| | 1 | 1 | 3 |
| CLK 0 | subscriber terminal 0 clock | | |
| CLK 1 | subscriber terminal 1 clock | | |
| CLK 2 | subscriber terminal 2 clock | | |
| CLK 3 | subscriber terminal 3 clock | | |
| CLK 4 | line card clock | | |
| MUXCLK | time multiplexed clock based on LC, A0, and A1 | | |

Low Pass Filter/Integrators Sub-Subsection

The low pass filter/integrators provide control voltages as required to adjust the voltage controlled crystal oscillator/divider circuits. The integrator reset is under control of the microprocessor. There are five identical low pass filter/integrator circuits. Only one of them is shown in FIG. 4C. The others are identical.

As illustrated in FIG. 4C, the low pass filter consists of U131A, R170, C153, C154, R178, R177, C152, and the "X" half of U140. Signal Definitions: FILTO—output of filter, CLKRSX'—clock resync signal from the microprocessor.

The output of the phase detector multiplexer, Y0 runs to the input of C152 which removes high frequency components. Effective cutoff frequency is set by the internal on resistance of phase detector multiplexer U130 and C152 and is nominally 130 KHZ.

This filter configuration is essentiallly an integrator with the transfer function:

$$E_{out} = \int_o^t e_{in}\, dt$$

The duty cycle of the phase detector output is integrated to produce an error voltage for the voltage controlled crystal oscillator (VCXO) (discussed later). The charge is accumulated on C153 and frequency limited by the RC combination R178, C154. R170 is used to bias the op amp. The power supply for the filter is a filtered version of VCC and VEE designated VCCA and VEEA.

Because the phase detector is only a phase detector and not a phase/frequency detector, there must be a method of "scanning" the lock range. This is done by resetting the integrator. Resetting is accomplished by taking the junction of R178, C153 to one of three jumper selectable potentials. The three potentials are VCC, VEE, and FILTO. Selecting either VCC or VEE causes the integrator to rail at one of the two supplies (depending on whether VCC or VEE is chosen). Selecting FILTO causes the output of the integrator to go to ground potential. Because R173 and R174 are not equal, the phase detector will tend to drift in one direction, consequently, the reset potential is selected in the opposite direction. The default connections are: P3 to P4 and PIN 13 to VCC. The integrator reset (clock resync) is under microprocessor control and is effected via the CLKRSO' signal.

Voltage Controlled Crystal Oscillator/Divider Sub-Subsection

There are five voltage controlled crystal oscillator/divider circuits. They preserve the clock frequency and phase information characteristic of the signals which are decoupled from each of the four subscriber transmitter/receivers and from the central office respectively. Each oscillator output is fed to the input of the clock multiplexer. Each oscillator is maintained at precisely the right frequency and phase to permit the original binary data transmitted to be accurately recovered.

The clock signals are designated CLK0, CLK1, CLK2, CLK3 and CLK4. Only the circuit for CLK0 is described in detail. The others are identical.

As illustrated in FIG. 4D, the voltage controlled crystal oscillator ("VCXO")/divider sub-subsection for generation of the CLK0 signal consists of U133A, U132, R181, R180, XT 100, C156, C155, V100, and R179. The oscillator frequency is set by crystal XT100, capacitor C156 and varactor V100 and is typically 767.870 KHz to 768.079 KHz. The capacitance of V100 is controlled by applying a voltage to V100 through R179, which in turn varies the frequency of the oscillator. C155 is used to A.C. couple the oscillator to the filter and is not a frequency determining component (because the capacitance of V100 is much less than the value of C155). The VCXO's output is not a linear function. Its control voltage frequency vs. output transfer function is given by $FO = (V_c - 4.3)\, 24.4 \times 10^3 + 768.870 \times 10^3$.

The output of the oscillator (nominally 6.144 Mhz) is fed to divider U132 and produces the recovered clock at 768 khz. As previously mentioned, this signal is time multiplexed and is a component of MUXCLK. This circuit is replicated 5 times (one for each subscriber terminal plus one for the line card to yield the CLK0, CLK1, CLK2, CLK3, and CLK4 signals respectively). The operation of each clock is identical.

CPU SUBSECTION

As FIG. 5 illustrates, the CPU subsection is divided into four sub-subsections: microprocessor and support; 010 detector; loopback control/data-clock multipler; and timing control. A fifth sub-subsection of the CPU is the software (hereinafter described in greater detail). These sub-subsections together constitute a "signal processing means" for controlling the operation of the signal coupling means, the clock recovery means, the data recovery means and the data conversion means discussed elsewhere herein. A brief overview of the operation of the CPU subsection is first provided, followed by a separate detailed description of each sub-subsection.

The binary data, RDATA, output of the RDRX subsection (described later) is fed into 3 CPU circuit configurations, the data-clock multiplexer, the 010 detector, and the timing control. The output of the data clock multiplexer, TXDATA, is the recovered binary data that was originally sent by the office line card and the four subscriber terminals. The TXDATA signal is the input signal to the RTX section transmitter described earlier. The RDATA signal fed into the timing control circuit provides output BDR, which is the input for the CKR section described earlier. The third RDATA input is to the 010 detector circuit which controls the overall timing generator, latching control and frame data bits. The microprocessor is used primarily as a timing generator controlled by the software, which stored in an EPROM.

In order to accurately decode the binary data precise timing, clock frequency and phase data for the incoming data bursts must be detected, established and preserved. The method used to communicate the required timing data from the transmitter location to the receiver location is the injection of a specific start pulse; namely, a "010" bit pattern at the beginning of each data burst. This 010 pattern is detected in the CPU for timing control of the repeater and in the CKR section to establish individual channel clock frequency and phase data for decoding the data bursts.

Microprocessor and Support Sub-Subsection

As illustrated in FIG. 5A, the microprocessor and support elements consist of U1, U2, C1, C2, C3, R1, and XT1. Microprocessor U1 is an 80C31 integrated circuit running at 12 MHz set by crystal XT1 and capacitors C1 and C2 to ensure stability of the internal oscillator. R1 and C3 generate a reset level for the microprocessor. The time constant is about 30 milliseconds, chosen to allow the oscillator and power supply to stabilize before starting execution. Due to low power requirements, a special version of the 27C64 EPROM is used. It is the 87C64, and incorporates the address latch internally, thus reducing power and space on the printed circuit board. Also the digital circuitry is powered at about 4.4 volts as opposed to 5.0 volts (designated as V+4.4 volts; VCC +5 volts). Single chip mode is employed with external read only memory (ROM), (EA'-external access tied low). The microprocessor is primarily a timing generator controlled by the program stored in the EPROM. This is covered later in the discussion of the software.

Table B set forth below provides the four port assignments of microprocessor U1:

TABLE B

| PORT 1: | |
|---|---|
| P1.0 selector line | A0 |
| P1.1 selector line | A1 |
| P1.2 selector line | LC/ST |
| P1.3 automatic gain control enable | AGCEN' |
| P1.4 shift register clear | SRC' |
| P1.5 loopback enable | LPBK' |
| P1.6 transmit enable | TX EN' |
| P1.7 transmit ones enable | TX ONES' |
| PORT 2: | |
| P2.0 address line 8 | A 8 |
| P2.1 address line 9 | A 9 |
| P2.2 address line 10 | A 10 |
| P2.3 address line 11 | A 11 |
| P2.4 address line 12 | A 12 |
| P2.5 address line 13 | A 13 |
| P2.6 address line 14 | A 14 |
| P2.7 address line 15 | A 15 |
| PORT 3: | |
| P0.0 multiplexed address/data bit 0 | AD0 |
| P0.1 multiplexed address/data bit 0 | AD1 |
| P0.2 multiplexed address/data bit 0 | AD2 |
| P0.3 multiplexed address/data bit 0 | AD3 |
| P0.4 multiplexed address/data bit 0 | AD4 |
| P0.5 multiplexed address/data bit 0 | AD5 |
| P0.6 multiplexed address/data bit 0 | AD6 |
| P0.7 multiplexed address/data bit 0 | AD7 |
| PORT 3: | |
| P3.0 control bit input | C BIT |
| P3.1 frame bit input | F BIT |
| P3.2 start bit detect | S B DET |
| P3.3 clock resync 0 | CLK RS0' |
| P3.4 clock resync 1 | CLK RS1' |
| P3.5 clock resync 2 | CLK RS2' |
| P3.6 clock resync 3 | CLK RS3' |
| P3.7 clock resync 4 | CLK RS4' |

010 Detector Sub-Subsection

As illustrated in FIG. 5B, the 010 detector consists of U6D, U6A, U3, U7A, and U7B. This circuit is responsible for controlling the overall timing generator as well as latching control and frame data bits. The received data (RDATA) is presented to shift register U3's data input (pins 1 & 2). The clock used to shift in the data is derived as follows. The basic frequency is the multiplexed clock (MUXCLK); this is gated to shift register U3, based on a number of conditions. Microprocessor U1 has overall control by virtue of controlling the shift register clear SRC' (pin 9, U3). If this is asserted, the 010 detector is disabled. If microprocessor U1 isn't asserting SRC', the data appearing at pins 1 & 2 of U3 is shifted in on the rising edge of MUXCLK. The clock is gated by the output of shift register U3, which is used to stop the clock after a predetermined number of data bits have been shifted in. This is done by allowing the "1" of the 010 bit pattern to propagate to the end of shift register U3, thus capturing the frame and control bits for use by microprocessor U1. The 010 pattern is detected by the gating of pins 4, 5 and 6 of U3 by U7A, U7B, and U6B, which runs to an interrupt on microprocessor U1. Note that the 010 pattern is detected and passed on to microprocessor U1 before shift register U3 is stopped; this is done to allow the capture of the frame and control bits.

To summarize, the 010 detector is enabled by the removal of the microprocessor-generated SRC' signal. As soon as an "010" pattern is detected an interrupt is generated to the microprocessor; five clock cycles later, shift register U3 is stopped (by removal of the clock), thus capturing the frame bit (at pin 11 of U3) and control bit (at pin 10 of U3). The 010 detector t1:us constitutes a "data burst detector means" for detecting within the decoupled, decoded signals a signal pattern identifying the start of a data burst transmission and for thereupon initiating recovery of the data burst by the data recovery means which is described hereinafter.

Loopback Control/Data-Clock Multiplexer Sub-Subsection

As illustrated in FIG. 5C, the loopback control/data clock multiplexer consists of U7C, U7D, U5A, U5B and U4. After microprocessor U1 detects a loopback command, it asserts LPBK'. This does two things; it changes the data path and clock path. By asserting LPBK$^1$, the select input of U4 goes low, selecting the "0" inputs of U4, hence TXCLK is now CLK4 (line card clock) and TXDATA is derived from CLK4. (Note that LC/ST is in the line card, LC mode while loopback is in progress). The data can take the form of either an alternating 010 pattern, an all ones pattern, or an all zero pattern. The latter two are controlled by microprocessor U1 via the set (U5A pin 4) and reset (U5A pin 1) inputs. These are used to sequence through the loopback test.

During loopback, it is desirable to suppress the control bit of all repeaters after the one being tested. This is the function of U7D. If the system is not in loopback, the S input of U4 (pin 1) is high, thus the clock is derived from MUXCLK, and the originally transmitted data is derived from the recovered data (RDATA) as blocked by U5B. The originally transmitted data, TXDATA, exits U4 pin 7 for input to the RTX transmitter discussed earlier.

This sub-subsection thus provides a "data clock multiplexer means" and a "signal loopback control means". The data clock multiplexer means is for receiving the RDATA signal and for producing the TXDATA signal in response. The signal loopback control means is for detecting signal loopback commands transmitted from the telephone central office and for asserting in response thereto, as the TXDATA signal, the signal which is received by the repeater from the telephone central office.

Timing Control Sub-Subsection

Figure 5D:
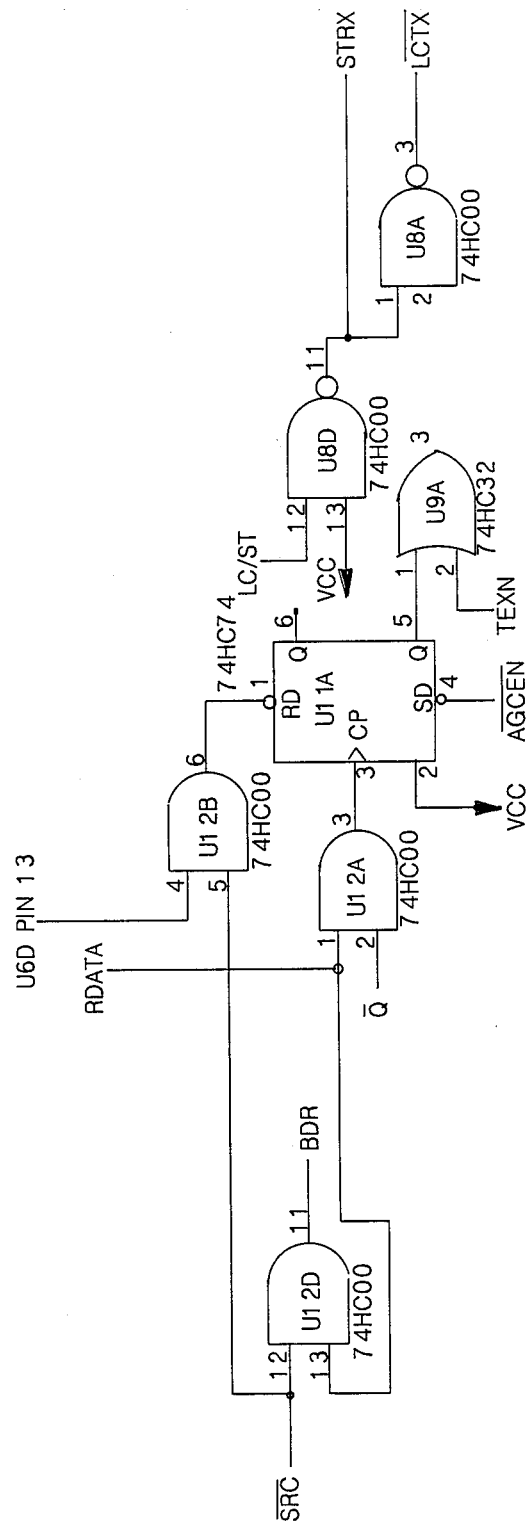
FIG. 5D is an electronic circuit schematic diagram of the timing control sub-subsection of the repeater microprocessor subsection.

As illustrated in FIG. 5D, the timing control circuit consists of U12A, U12B, U12D, U11A, U8A, U8D and U9A. Some of the timing generation must be done at a speed faster than microprocessor U1 is capable of generating. This is the function of the timing control circuit. The signal STRX, is generated by inverting LCST'. This signal is active when the repeater is receiving from the subscriber terminals. The signal LCTX' is generated if the global transmit is enabled, and the repeater is receiving from the subscriber terminal direction. The rest of the gating logic is used to time these two signals.

The timing control circuitry provides a "timing control means" for receiving the RDATA signal and controlling its conversion into the BDR signal.

Software Sub-Subsection

Appendix "A" submitted herewith is an 8 page software source code listing (written in 8031 Assembler code) of the computer program which controls the operation of the CPU subsection and hence the overall operation of the repeater. It is believed that the detailed comments embedded in Appendix "A", together with the software flowcharts comprising FIGS. 7 through 10, will enable those skilled in the art to understand the software operation. Nonetheless, a brief overview of the software is now provided.

Basic flow is to initialize the hardware and software, and then start execution of main control loop (which is an endless loop). The main control loop is timed by timer T1. It is set to generate an interrupt about once every 25 milliseconds to insure the line will eventually turn around to the line card direction. Timer T0 is used to control the intra burst timing (period from burst to burst). The value loaded into timer T0 is a function of the burst being processed; it has two values; namely, 400 microseconds (line card burst) and 100 microseconds (subscriber terminal burst).

There is one other interrupt critical to operation of the repeater, namely "EXINT0". This interrupt is activated by the 010 detector and drives the entire repeater timing section. Basic flow is as follows. Power on entry at PWRON, branches to STAR START initializes software (stack, frame length, etc.) and hardware (timer modes, i/o ports, etc.), it also enables the timer interupts and starts the burst length timer (T1) running.

MAIN puts out the initial timing sequences STATE 0 and STATE 1, with no between states; enables the 010 detector and its associated interrupt (EXINT0); then enters the idle state. During the idle state, the system uses significantly less power, which is critical in order to keep power requirements below 100 ma. The system comes out of the idle state on two conditions; namely, when T1 times out; or, when a 010 pattern is detected, denoting the start of a data burst. If T1 times out, the system has not received any valid data and will try again by branching back to MAIN. If the interrupt was caused by EXINT0, then a 010 start pattern was detected and processing continues with the next instruction, which generates the next timing sequence as well as initializing the subscriber terminal burst counters. Before entering the next idle state, timer T1 is reloaded with the remaining burst length and the next timing sequence is generated. Again, two different interrupts will restart the processor; either T1 timing out or a 010 detect. If T1 times out, a restart is initiated (branch to MAIN from the interrupt service routine); whereas if EXINT0 generated the interrupt, processing continues with the next instruction. At this point, the shift register contains the frame and control bit pattern for ST0. In order to receive commands from the line card (loopback/clock commands) these bits are read in and stored (routine RDFCBIT). Next, the clocks are checked to process any integrator resets that may have been requested. The flag F0 is then checked to see whether the repeater has been put into loopback mode. If F0 is set, it is in normal mode, if F0 is cleared, it is in loopback mode. Finally, the next idle state is entered and the system waits for either T1 to time out or the next 010 to be detected.

The same procedure is repeated for all subscriber terminals. Loopback is basically the same, with the exception that repeater-generated data is transmitted in ST0's time slot and the pattern transmitted is a function of the command data being transmitted from the line card.

Routine RDFCB11 reads the frame and control bits into two 16 bit circular buffers. R0 and R1 is the frame bit register. R2 and R3 is the command bit register. Routine FNDFRAME checks to see that the frame pattern is present and aligns the bit counter to compensate for any misalignment problems. The routine is also responsible for initiating a clock reset if it is unable to find the transmitted frame pattern. Routing CRSMON monitors the time between ST bursts. If it exceeds a preset maximum, a clock reset is generated. Refer to the enclosed software source code listing in appendix A and to the flowcharts contained in FIGS. 7 to 10 for more detail.

The RDRX Subsection

Figure 6A:
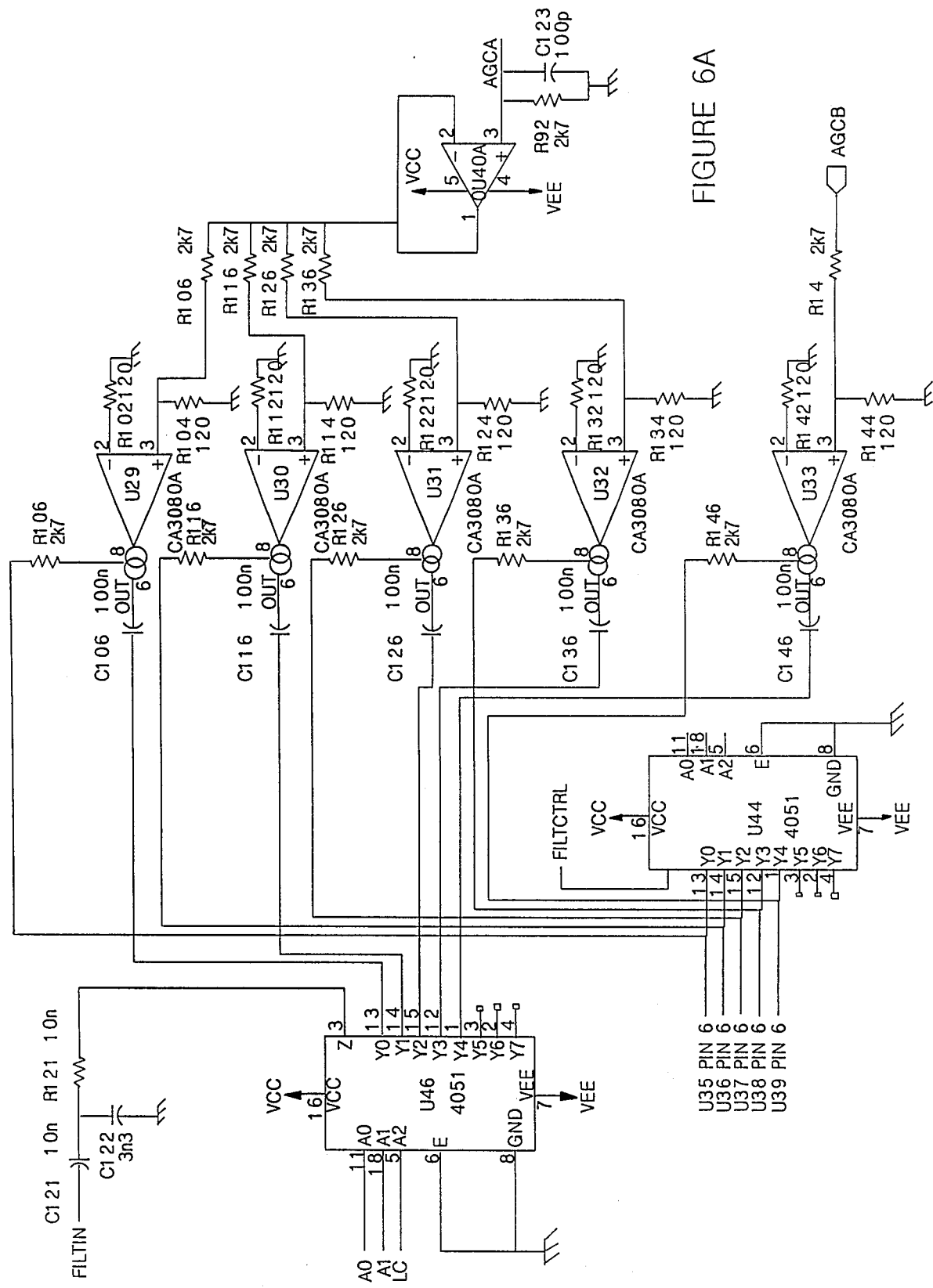
FIG. 6A is an electronic circuit schematic diagram of the AGC A and AGC B receiver sub-subsection of the repeater data recovery subsection.
Figure 6B:
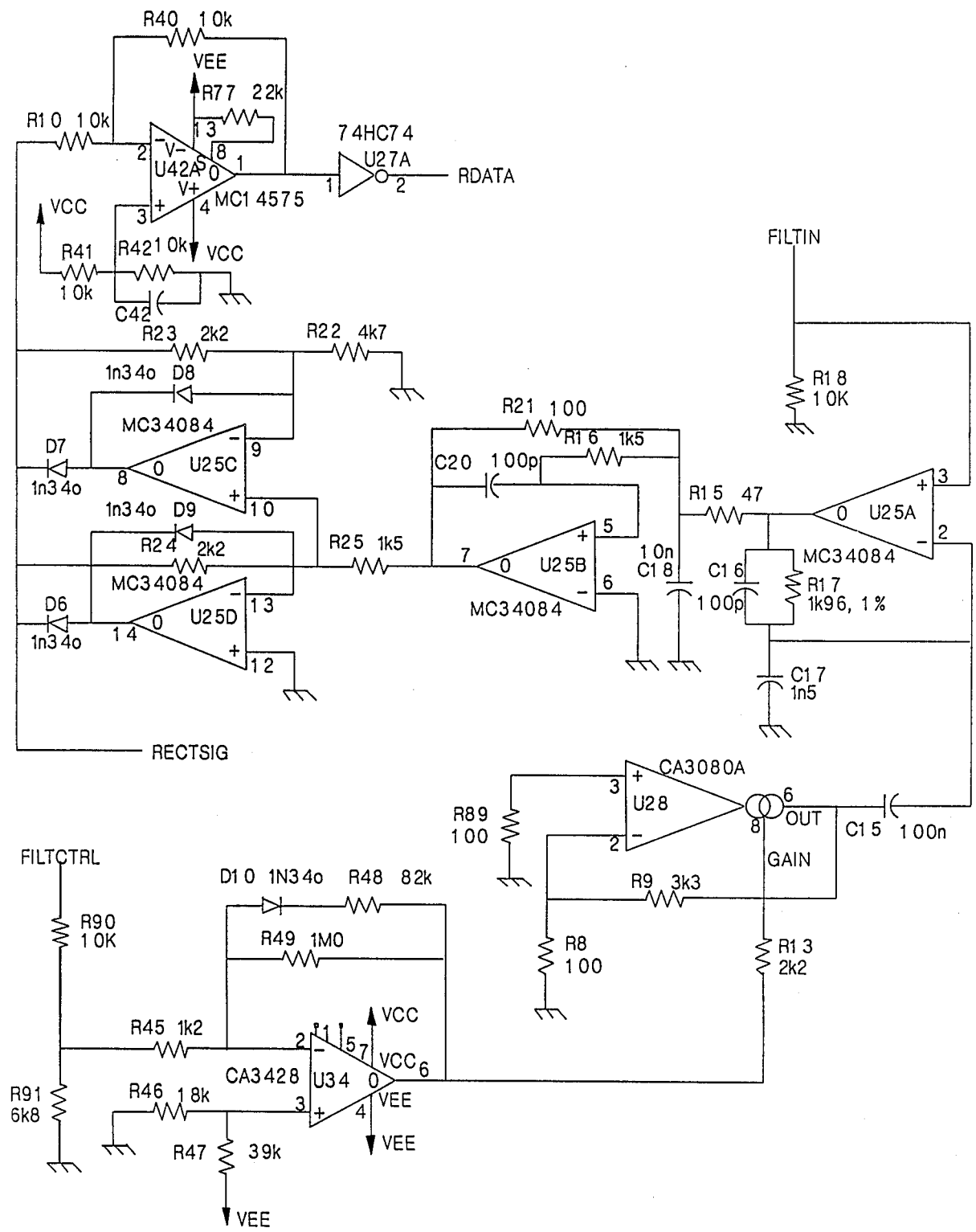
FIG. 6B is an electronic circuit schematic diagram of the filter/equalizer and data recovery subsubsection of the repeater data recovery subsection.
Figure 6C:
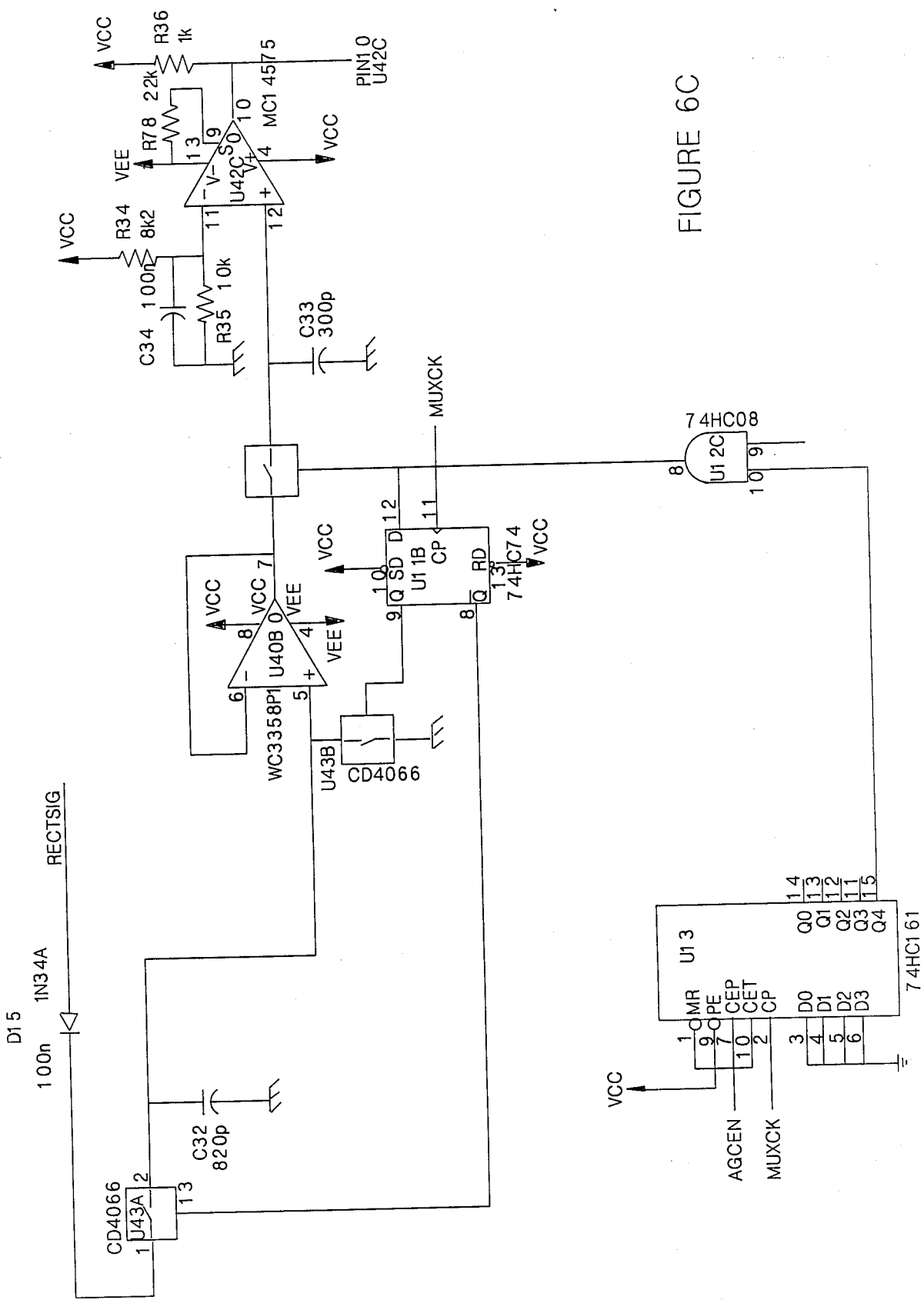
FIGS. 6C and 6D are electronic circuit schematic diagrams of the AGC/filter control sub-subsections of the repeater data recovery subsection.
Figure 6D:
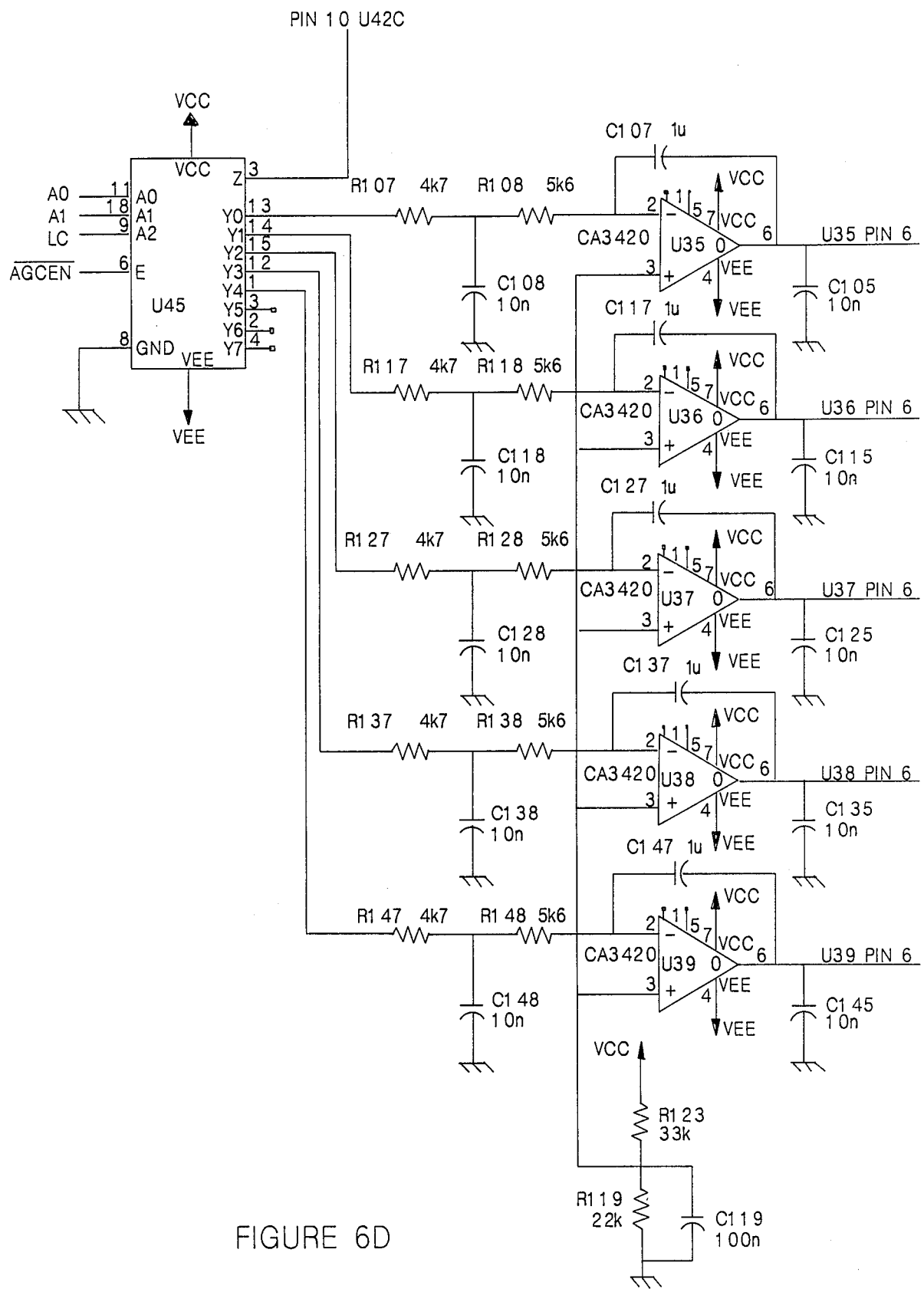
Figure 7:
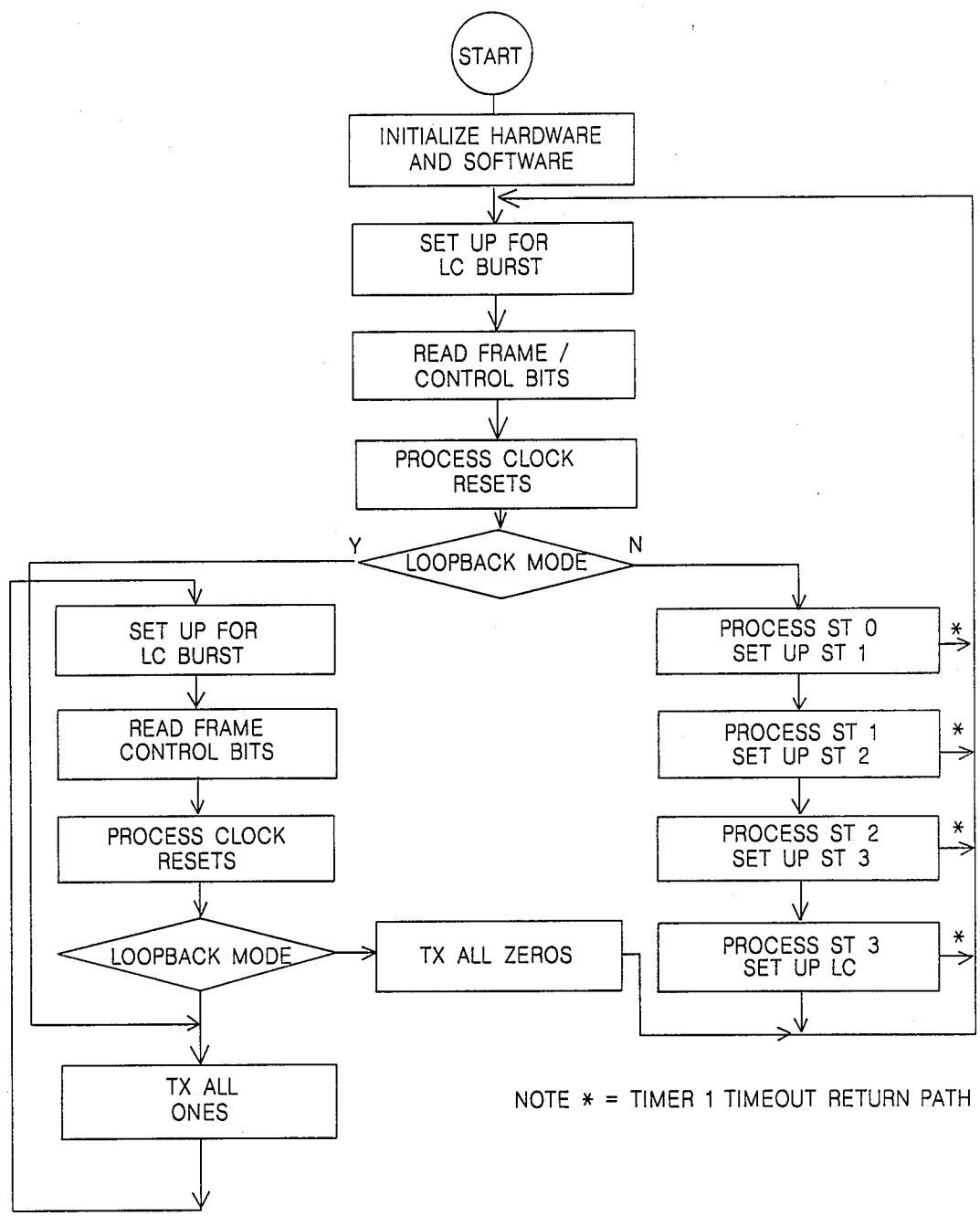
FIG. 7 is a software flowchart which provides an overview of the timing functions performed by the repeater microprocessor subsection.
Figure 8:
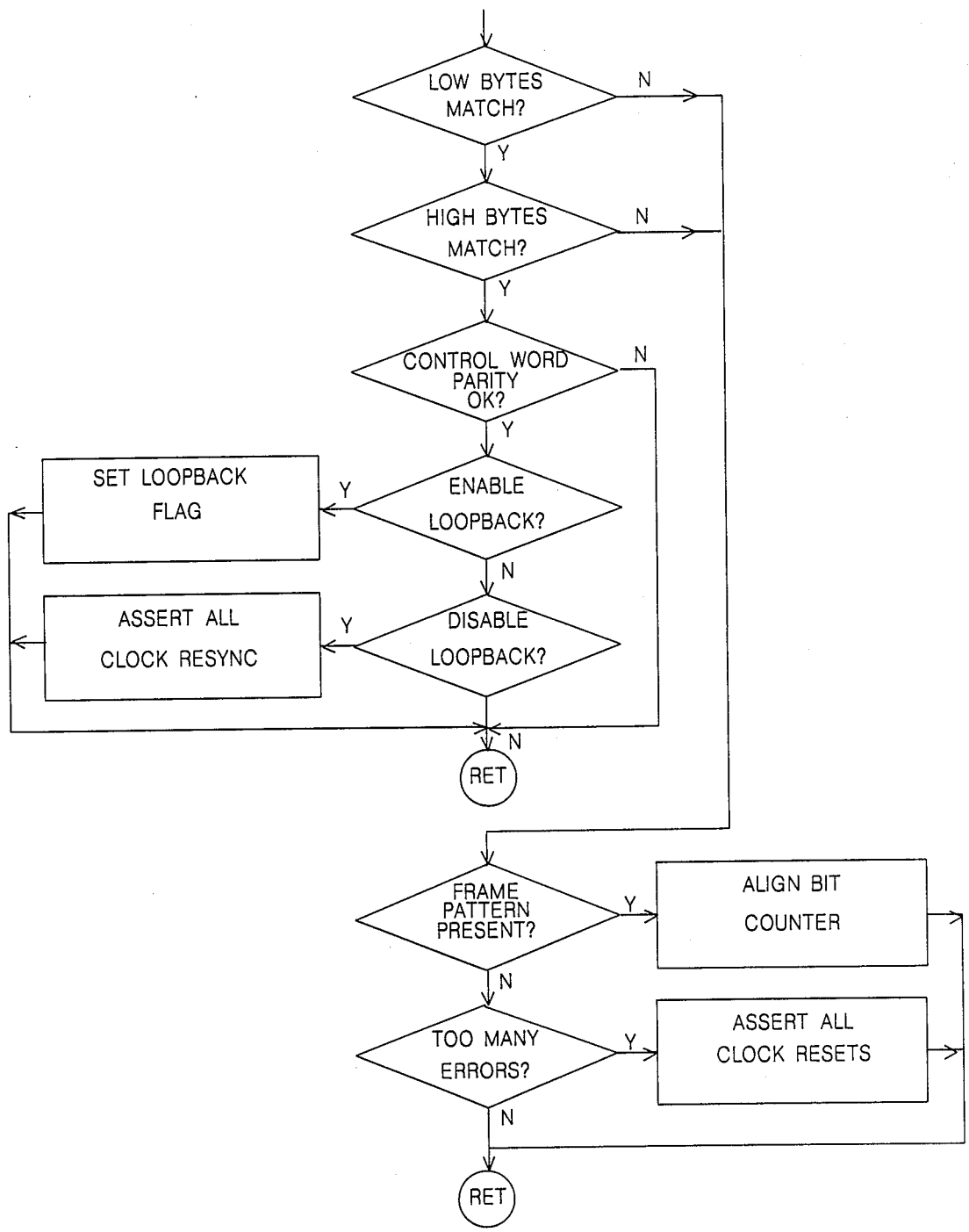
FIG. 8 is a software flowchart of the computer program which checks the frame pattern of the transmitted signal and corrects misalignment problems.
Figure 9:
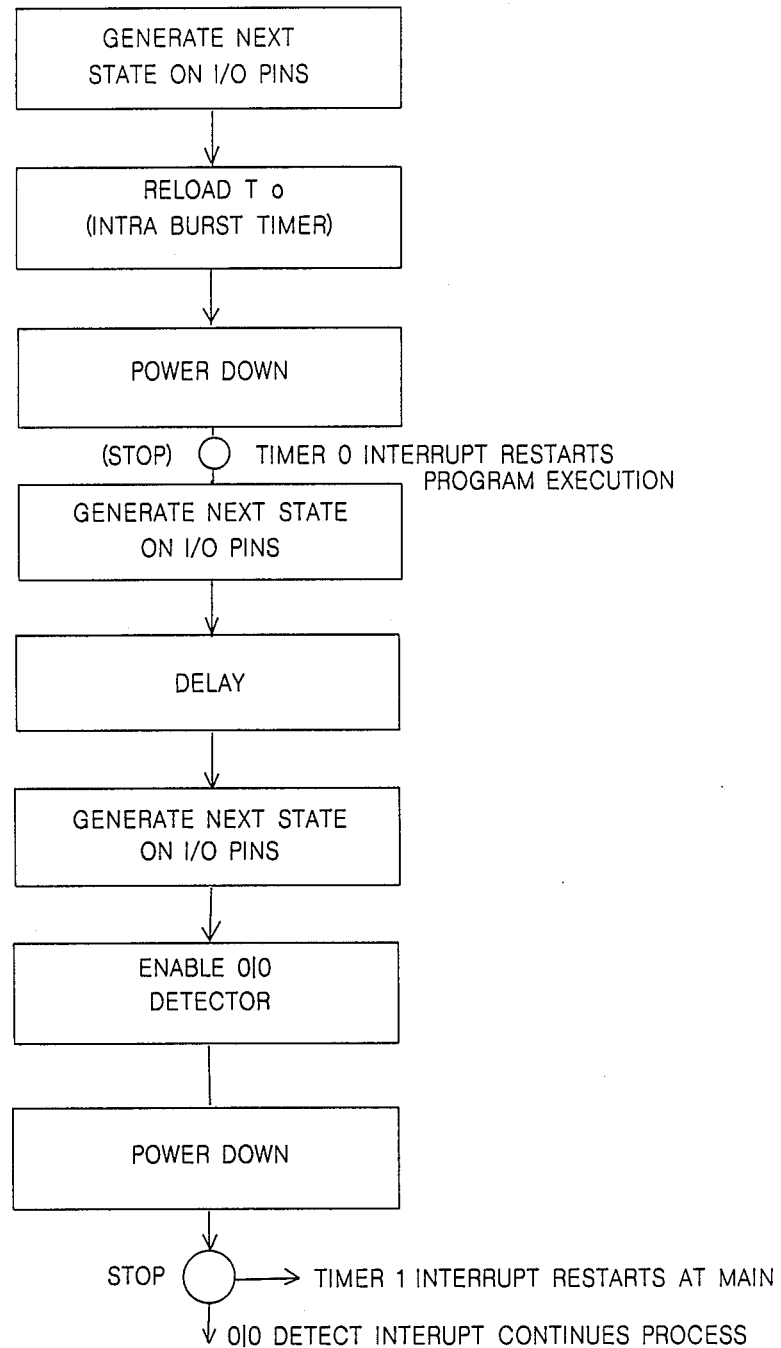
FIG. 9 is a software flowchart of a typical process/setup block.
Figure 10:
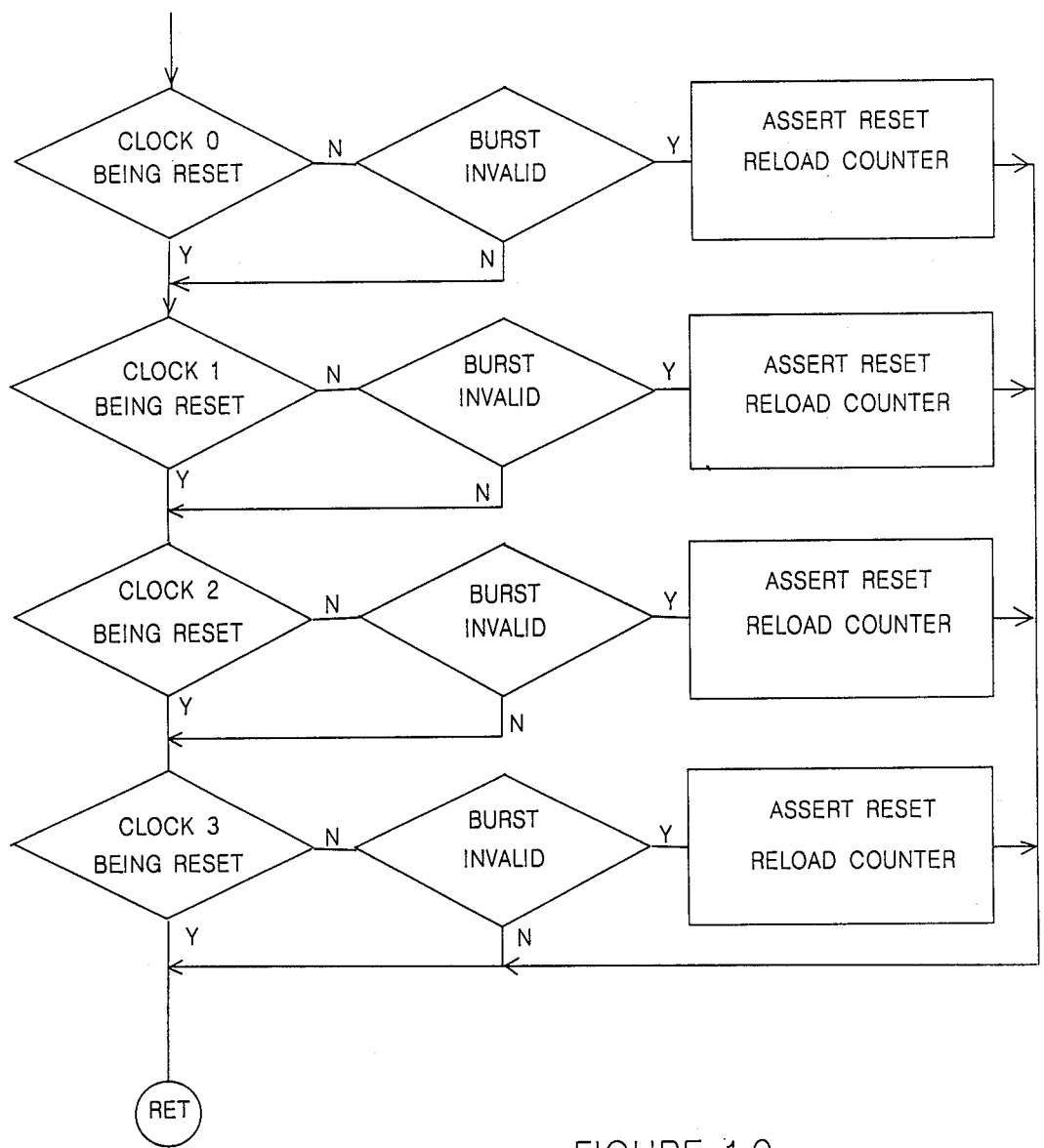
FIG. 10 is a software flowchart of the computer program which monitors the time between subscriber terminal data burst transmissions.

As FIG. 6 illustrates, the RDRX subsection is divided into three sub-subsections: the AGC A and B receivers, FIG. 6A; the filter control and data recovery, FIG. 6B; and, the AGC and filter control, FIGS. 6C and 6D. The RDRX subsection serves as a "data recovery means" for decoding the signals which are decoupled from the line and for regenerating the decoded signals to replicate the signals originally produced by the telephone central office and subscriber transmitter/receivers respectively. A brief overview of the operation of the RDRX subsection is first provided, followed by a separate detailed description of each of its sub-subsections.

The RTX AGC A and B signals are the input to the RDRX subsection (FIG. 6A) where there are four AGC A circuits and one AGC B circuit with outputs multiplexed into one series of filter, equalizer and rectifier circuits to decode the data bursts (FIG. 6B). The rectified data signal is fed into two circuits, a data comparator to recover binary data (in FIG. 6B) and a level comparator (FIG. 6C) with output used for feedback control of the AGC/filter circuits. The output of the level comparator (FIG. 6C) is fed to an integrator input multiplexer (FIG. 6D) which in turn feeds five intregrators. The five separate integrator signals are fed into an output multiplexer (FIG. 6A) under CPU command which establishes AGC and filter control. The output of the data comparator RDATA is binary data which is fed into the CPU section.

AGC A and AGC B Receiver Sub-Subsection

This sub-subsection consists of the AGC A and AGC B receiver circuits, receiver multiplexer and the integrator output multiplexer. The latter is described subsequently under the subheading "AGC Filter Control Sub-Subsection".

As FIG. 6A illustrates, the AGC A and AGC B receivers consist of five identical circuits, typically R100, R102, R104, U29, C106, and R106. Each circuit is configured as an attenuator with a dynamic range of 40 db. The voltage at pin 5 sets the level of attenuation; −44 db at −4.2 v and −0.3 db at ±4.5 volts. Input level range is from 60 mv peak to peak, thru 10 v peak to peak. C106 is a D.C. blocking capacitor used to couple the signal to the filter. Because of loading configurations on the transformers (AGC A drives 4 op amps, AGC B drives only one op amp) a buffer is inserted into the AGC A path and consists of U40A, R92 and C123. The configuration of the circuit is a voltage follower with a low pass filter on the input.

The receiver multiplexer circuit consists of components U46, C121, R18, R121, and C122. Depending on the burst being processed, as selected by lines A0, A1, and LC, the attenuated signal is selected by U46. The output of the multiplexer runs to a low pass filter (R121, C122) and then to a high pass filter (C121, R18). This signal is called FILTIN and serves as the input to the equalizer/filter.

It will thus be seen that the AGC A and AGC B receiver sub-subsection incorporates first, second, third, fourth and fifth receivers for selectively receiving decoupled signals from the telephone central office and from the subscriber transmitter/receiver respectively; and a multiplexer or "receiver selector means" for selectably actuating one of the five receivers to pass such signals.

Filter/Equalizer and Data Recovery Sub-Subsection

The filter control and data recovery is divided into 5 circuit configurations: the equalizer (variable filter), filter (fixed), full wave rectifier, data comparator, and filter control shaper; each of which is now described with reference to FIG. 6B. The detailed description of the filter control shaper is given subsequently as part of the AGC filter control sub-subsection description.

Equalizer (variable filter)

Figure 11:
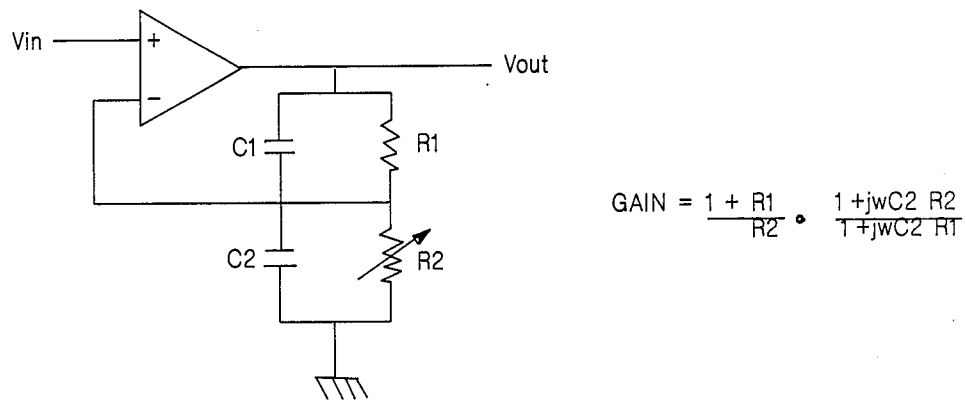
FIG. 11 is an electronic circuit schematic diagram which illustrates the basic configuration of the variable filter incorporated in the repeater data recovery subsection.
Figure 12:
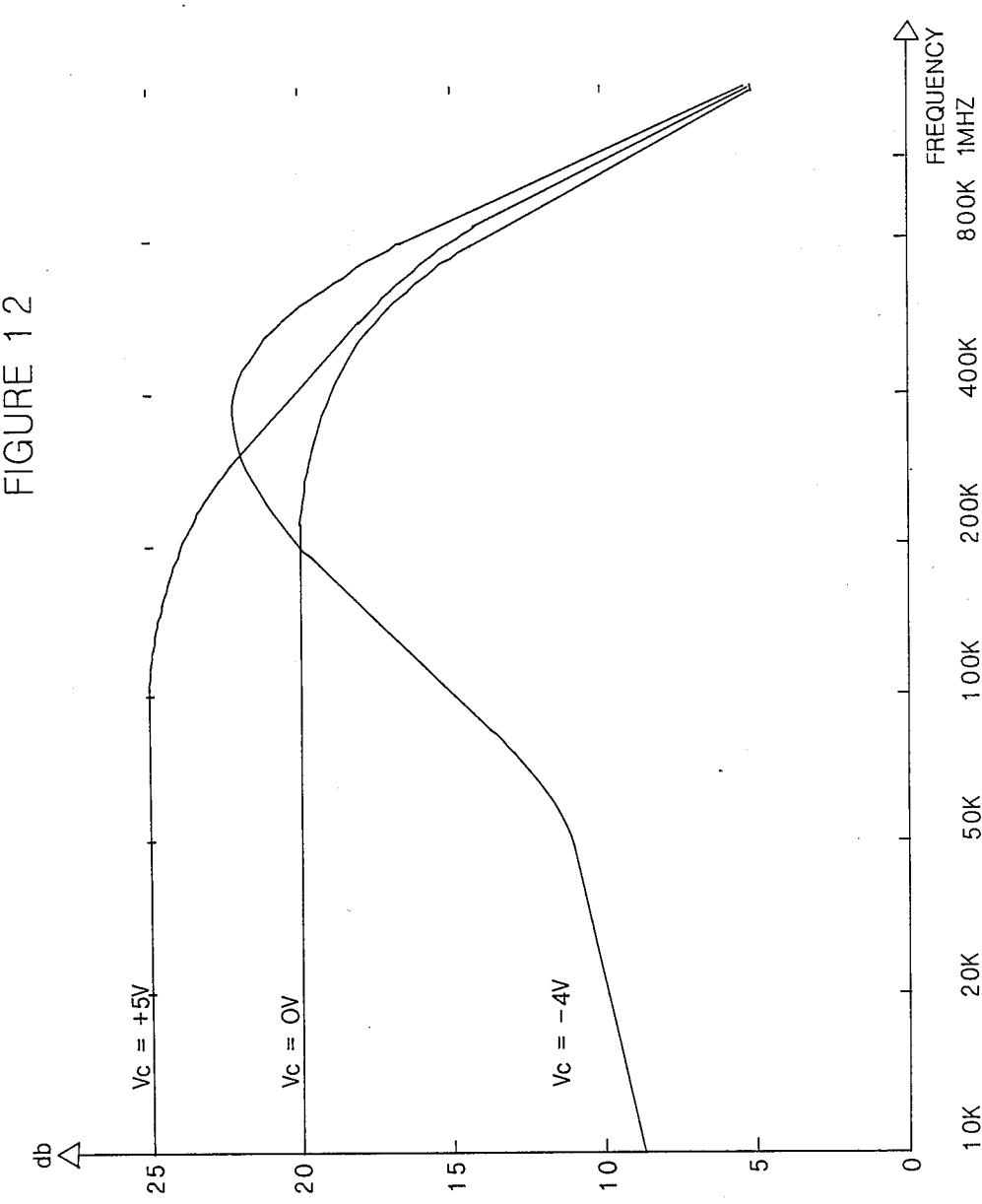
FIG. 12 is a graph which illustrates the transfer function of a variable filter constructed in accordance with FIG. 11.

The variable filter equalizer or "filter means" compensates for the different impedances (and hence attenuation) seen by the receivers as the repeater switches repetitively from the central office to each of the subscribers and back. It consists of components U25A, C16, R17, C17, as well as C15, U28, R13, R8, R9 and R89 which serves as the second variable resistor of the variable filter. The basic circuit configuration is shown in FIG. 11. The circuit is a non-inverting op amp with one pole and one zero inserted into the feedback loop. The pole is fixed at about 768 khz by components C16 and R17 (represented as C1 and R1 in FIG. 11). The zero is variable and is set by C17 and U28 (represented as C2 and R2 in FIG. 11). U28 is essentially configured as a variable resistor, changing from 44 k (control voltage = −4.7 v) to 260 ohms (control voltage = +4.0 volts). The control voltage moves the zero from 2.44 khz (44 k) to 408 khz (260 ohms). FIG. 12 depicts the approximate transfer function of the variable filter.

Fixed Filter

Figure 14:
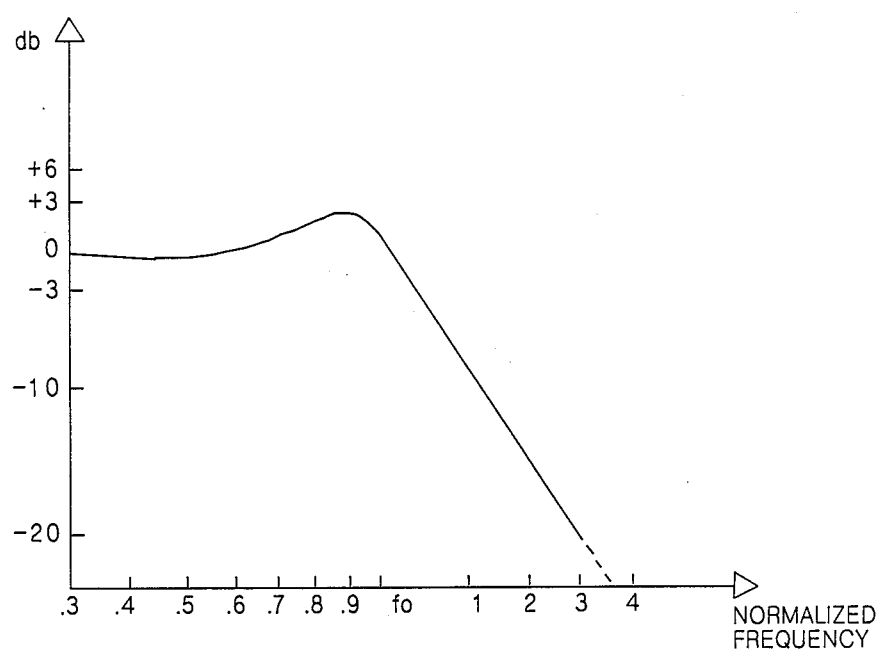
FIG. 14 is a graph which illustrates the approximate transfer function of a second order Sallen-key filter constructed in accordance with the preferred embodiment.

The fixed filter consists of components U25B, R15, C18, C20, R16 and R21 (FIG. 6B). It is an inverting second order Sallen-key filter with a center frequency at 402 khz and a Q of 1.3. Characteristics of a second order Sallen-key filter are: attenuation of 12 db per octave, phase shift frequency dependent varying from +90 to −90 degrees, and easily selectable damping Q factor. The fixed filter passes all signals below its cutoff frequency, as depicted in filter transfer function comprising FIG. 14.

Full Wave Rectifier

The full wave rectifier consists of components U25C, U25D, R25, R24, D9, D6, D7, D8, R23, and R22. U25C rectifies the positive peaks (non-inverting configuration) and U25D rectifies the negative peaks (inverting configuration). The outputs are "ored" together by diodes D6 and D7 and feed the data comparator and control circuits.

Data Comparator

The data comparator consists of components U42A, R41, R42, C42, R10, R40, R77 and U27A. After the data has been full wave rectified, it is put through a unity gain level shifter. If the signal is less than 2.5 volts a logic one (+5 v) is generated. If the signal is more than 2.5 volts, a logic 0 (0 v) is generated. Because the data is inverted by U42A, U27A is used to correct the polarity of the received data. Note that this signal is not to be confused with the recovered data which is derived by sampling this signal on the rising edge of MUXCLK.

The data comparator constitutes a "data comparator means" for comparing the voltage of signals output by the second filter means with a reference voltage signal and for producing the RDATA output signal by generating a first binary signal when the voltage of the signal output by the second filter means exceeds the reference voltage, and a second binary signal when the reference voltage exceeds the voltage of the signal output by the second filter means.

AGC Filter Control Sub-Subsection

This sub-section can be divided into 6 circuit configurations: sample/hold, timing generator, level comparator, integrator input multiplexer, integrator, and integrator output multiplexer; each of which is now described with reference to FIGS. 6C, 6D and part of FIG. 6A.

The sample and hold circuit consists of D15, U43A, C32, U43B and U40B shown in FIG. 6C. U43A and U43B are used to alternately clear and charge storage capacitor C32. When U43A is on, U43B is off and vice versa. This is controlled by flip-flop U11B, which is in turn controlled by the timing generator described in the next paragraph. Op amp U40B is configured as a voltage follower so as not to discharge storage capacitor C32 when a charge is being accumulated on it.

The timing generator consists of U13 and U12C shown in FIG. 6C. Every 16 clock pulses (as counted by U13) cause the sample and hold to cycle. Because data is windowed by the signal AGCEN, it is used as a gate to disable the sample and hold circuit when no burst is being processed.

The level comparator consists of C33, U42C, R35, C34, R34, R78 and R36 shown in FIG. 6C. The level accumulated by the sample and hold circuit is filtered by C33 and then fed to U42. This level is compared to a reference of about 3 volts and causes the output of the comparator to switch accordingly. R36 acts as a pull up resistor.

The integrator input multiplexer consists of U45 shown in FIG. 6D. Based on which burst is being processed as selected by A1, A0, and LC, the comparator output is routed to one of the five integrators used to derive the AGC/Filter control voltages. Again note that the multiplexer is enabled/disabled by the signal AGCEN' in order to disconnect all integrators when no burst is being processed.

The integrator consists of R107, C108, R108, C107, U35, C105, R123, R119 and C119 shown in FIG. 6D. Note that there are five identical circuits. The output of the multiplexer is fed to the low pass filter consisting of R107 and C108. This removes any high frequency noise from the signal. The filtered signal is fed to the integrator and charges/discharges C107, based on the level presented to the input of R108. The divider network R123, R119, and C119 is required because the input voltage ranges between 0 and 5 volts, whereas U35's power supply is +5 v. The output of the integrator is further filtered by C105 to give an effective D.C. level to control the AGC/equilizer.

The integrator output multiplexer consists of U44 shown in FIG. 6A. Note that the output of the integrator runs directly to the control input on the AGC amplifier. This method was chosen to minimize the glitching induced when switching from channel to channel. Because the filter/equalizer is multiplexed between the five channels (4 subscriber terminals and 1 line card), the output of the 5 integrators run to multiplexer U44. The signals A0, A1, and LC select which of the five integrators will control the equalizer filter.

Filter Control Shaper

Figure 13:
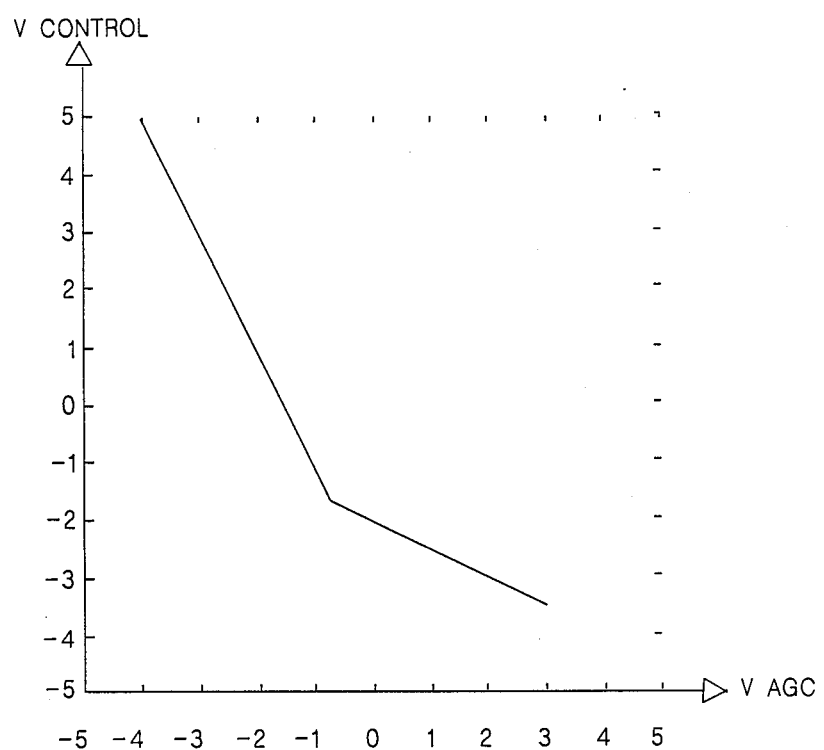
FIG. 13 is a graph which illustrates the approximate filter control transfer function of a typical variable filter constructed in accordance with FIG. 11.

The filter control shaper consists of U34, R90, R91, R46, R47, R45, D10, R48, and R49 shown in FIG. 6B. The control voltage for the variable filter loop is derived from U34. The transfer function to op timize the eye diagram was experimentally determined and is depicted in FIG. 13. The circuit represented by the aforementioned components approximates this function. Based on the level of the input, the feedback elements change.

As will be apparent to those skilled in the art in the light of the foregoing disclosure, many al terations and modifications are possible in the practice of this invention without departing from the spirit or scope thereof. Accordingly, the scope of the invention is to be construed in accordance with the substance defined by the following claims.

APPENDIX "A"

```
.TITLE "Repeater Timing Generator"

;       Revision 3              October 28, 1985
;
;       Add program for loopback conditions
;
.PAGE
.SBTTL "Equated Symbols"
;       Repeater State Output Table
;                                       ;  TX1' TXEN LPBK' SRC' AGC' LC/ST' A1 A0
STATE0          EQU     10101100B       ;   1    0    1    0    1    1     0  0
STATE1          EQU     10111100B       ;   1    0    1    1    1    1     0  0
STATE2          EQU     10110100B       ;   1    0    1    1    0    1     0  0
STATE3          EQU     10101000B       ;   1    0    1    0    1    0     0  0
STATE4          EQU     10111000B       ;   1    0    1    1    1    0     0  0
STATE5          EQU     10110000B       ;   1    0    1    1    0    0     0  0
STATE6          EQU     10101001B       ;   1    0    1    0    1    0     0  1
STATE7          EQU     10111001B       ;   1    0    1    1    1    0     0  1
STATE8          EQU     10110001B       ;   1    0    1    1    0    0     0  1
STATE9          EQU     10101010B       ;   1    0    1    0    1    0     1  0
STATE10         EQU     10111010B       ;   1    0    1    1    1    0     1  0
STATE11         EQU     10110010B       ;   1    0    1    1    0    0     1  0
STATE12         EQU     10101011B       ;   1    0    1    0    1    0     1  1
STATE13         EQU     10111011B       ;   1    0    1    1    1    0     1  1
STATE14         EQU     10110011B       ;   1    0    1    1    0    0     1  1
;
;  loopback states
;
STATE15         EQU     10001100B       ;   1    0    0    0    1    1     0  0
STATE16         EQU     10011100B       ;   1    0    0    1    1    1     0  0
STATE17         EQU     10010100B       ;   1    0    0    1    0    1     0  0
STATE18         EQU     10001000B       ;   1    0    0    0    1    0     0  0
STATE19         EQU     10001000B       ;   1    0    0    0    1    0     0  0
STATE20         EQU     11000000B       ;   1    1    0    0    0    0     0  0
STATE21         EQU     01000000B       ;   0    1    0    0    0    0     0  0
STATE22         EQU     10001001B       ;   1    0    0    0    1    0     0  1
STATE23         EQU     10001001B       ;   1    0    0    0    1    0     0  1
STATE24         EQU     10000000B       ;   1    0    0    0    0    0     0  0

TMODVAL         EQU     00010001B       ; TIMER 0 MODE 1
                                        ; TIMER 1 MODE 1

INTEVAL         EQU     10001010B       ; TIMER 0/TIMER 1 INTERRUPTS ENABLED
                                        ; GLOBAL ENABLE

FTH             EQU     0F6H            ; FRAME TEMPLATE HIGH
FTL             EQU     014H            ; FRAME TEMPLATE LOW
FRLEN           EQU     16              ; NUMBER OF BITS IN FRAME REGISTER
FMMAX           EQU     168             ; MAXIMUM FRAME ERROR COUNT BEFORE
                                        ; RESYNC IS ISSUED
```

```
LPBKENBL        EQU     60              ; LOOPBACK ENABLED COMMAND
LPBKDSBL        EQU     61              ; LOOPBACK DISABLED COMMAND

PCON:           EQU     087H            ; POWER CONTROL REGISTER

MST0            EQU     030H            ;MISSED ST0 BURST COUNTER
MST1            EQU     031H            ;MISSED ST1 BURST COUNTER
MST2            EQU     032H            ;MISSED ST2 BURST COUNTER
MST3            EQU     033H            ;MISSED ST3 BURST COUNTER

MSTMAX          EQU     16              ;MAXIMUM NUMBER OF MISSED ST
                                        ;BURSTS BEFORE CLOCK RESET ISSUED

;       define timer load values

TH1VAL          EQU     250             ; FOR TIMING THE 1.5msec BURST
TL1VAL          EQU     85              ; FOR TIMING THE 1.5 msec BURST TH0LC           EQU     254             ; FOR TIMING THE LINE CARD BURST
TL0LC           EQU     29              ;(32) FOR TIMING THE LINE CARD BURST TH0ST           EQU     255             ; FOR TIMING THE ST BURST
TL0ST           EQU     152             ; FOR TIMING THE ST BURST .PAGE
.SBTTL "System Interrupt Vectors"

ORG     0H
PWRON:
        JMP     START                   ;; POWER ON RESET

ORG     3H
EXINT0:
        CLR     IE.0                    ;; DISABLE 01 DETECTOR
        CLR     P1.3                    ;; ENABLE LINE DRIVER
        RETI                            ;; LOW AS EARLY AS POSSIBLE THEN RETURN

ORG     0BH
TMR0INT:                                ;; TIMER 0 USED FOR INTRA BURST
        RETI                            ;; POWER DOWN SEQUENCING

ORG     01BH
TMR1INT:                                ;; TIMER 1 USED FOR 1.5 MSEC FRAME TIME
        CLR     IE.0                    ;; DISABLE 010 INTERRUPTS
        JNB     F0,TIMEOUT              ;; BRANCH IF IN LOOPBACK
        CALL    TIMEOUT                 ;; RESET INTERRUPT LOGIC
        DEC     SP                      ;; CLEAN UP ...
        DEC     SP                      ;; ... THE STACK
        JMP     MAIN                    ;; AND BRANCH TO STATE 0

;       Timer 1 interrupt reset routine
TIMEOUT:
        RETI                            ;; RESET INTERRUPT LOGIC
.PAGE
.SBTTL "System Initialization"
;
;       This sequence initializes the system software / hardware
;       parameters.
START:
        MOV     SP,#7                   ;; RESET STACK POINTER
        MOV     TMOD,#TMODVAL           ;; SET UP TIMER MODE(TMR0 & TMR1 MODE 1)
        MOV     R5,#FMMAX               ;; RESET FRAME MISSED COUNTER
        MOV     R6,#FRLEN               ;; INIT FRAME BIT COUNTER
        MOV     IE,#INTEVAL             ;; SET UP INTERRUPT MASK
        SETB    F0                      ;; SET LOOPBACK FLAG TO LOOPBACK DISABLED STATE
```

```
        MOV     P3,#00000111B    ;; CLEAR THE INTEGRATERS ON ALL FIVE CLOCKS
                                 ;; THE LAST 3 BITS ARE ONES BECAUSE THEY ARE
                                 ;; INPUTS. THEN SET UP TMR0 TO COUNT FOR 109uSECS
        MOV     MST0,#MSTMAX     ; INIT THE MISSED ST BURST COUNTERS
        MOV     MST1,#MSTMAX     ; INIT THE MISSED ST BURST COUNTERS
        MOV     MST2,#MSTMAX     ; INIT THE MISSED ST BURST COUNTERS
        MOV     MST3,#MSTMAX     ; INIT THE MISSED ST BURST COUNTERS
        MOV     TCON,#0          ;; STOP TIMERS
        MOV     TH1,#TH1VAL      ;; LOAD TIMER 1 HIGH BYTE (FRAME LENGTH)
        MOV     TL1,#TL1VAL      ;; LOAD TIMER 1 LOW BYTE
        MOV     TCON,#01000000B  ;; START TIMER 1

.PAGE
.SBTTL "Main Control Loop"
MAIN:
        MOV     P1,#STATE0       ;; SET UP MUX, CLEAR 010 DETECTOR
        NOP
        MOV     P1,#STATE1       ;; ENABLE SHIFT REGISTER
MAINLC:
        SETB    IE.0             ;; ENABLE 010 DETECTOR
        ORL     PCON,#1          ;; ENABLE IDLE MODE,... WAIT FOR INTERRUPT
        MOV     P1,#STATE2       ;; ENABLE AGC
        MOV     TCON,#0          ;; STOP TIMERS
        MOV     TH0,#TH0LC       ;; LOAD TIMER 0 HIGH BYTE (BURST LENGTH)
        MOV     TL0,#TL0LC       ;; LOAD TIMER 0 LOW BYTE
        MOV     TH1,#TH1VAL      ;; LOAD TIMER 1 HIGH BYTE (FRAME LENGTH)
        MOV     TL1,#TL1VAL      ;; LOAD TIMER 1 LOW BYTE
        MOV     TCON,#01010000B  ;; START TIMERS
        SETB    P3.7             ; ENABLE CLOCK4
        CALL    RDFCBIT          ;; PROCESS FRAME/COMMAND DATA
        CALL    CRSMON           ; MONITOR IF CLOCK RESET OF ST'S IS NEEDED
        JB      F0,MAIN15        ;; BRANCH IF NOT IN LOOPBACK STATE
        AJMP    LPBKLCB          ;; BRANCH TO LOOPBACK ROUTINE
MAIN15:
        ORL     PCON,#1          ;; ENABLE IDLE MODE,... WAIT FOR INTERRUPT
        MOV     P1,#STATE3       ;; DISABLE AGC, SET UP MUX, CLEAR 010 DETECTOR
        NOP                      ;; WAIT FOR ...
        NOP                      ;; ... LINE ...
        NOP                      ;; ... TO TURN AROUND
        NOP
        NOP
        NOP
        NOP
        MOV     P1,#STATE4       ;; ENABLE SHIFT REGISTER
MAINST0:
        SETB    IE.0             ;; ENABLE 010 DETECTOR
        ORL     PCON,#1          ;; ENABLE IDLE MODE,... WAIT FOR INTERRUPT
        MOV     P1,#STATE5       ;; ENABLE AGC
        CLR     TCON.4           ;; STOP TIMER 0
        MOV     TH0,#TH0ST       ;; LOAD TIMER HIGH BYTE (BURST LENGTH)
        MOV     TL0,#TL0ST       ;; LOAD TIMER LOW BYTE
        SETB    TCON.4           ;; START TIMER
        SETB    P3.3             ; ENABLE CLOCK0
        INC     MST0             ; INCREMENT THE MISSED ST BURST COUNTER
        ORL     PCON,#1          ;; ENABLE IDLE MODE,... WAIT FOR INTERRUPT
        MOV     P1,#STATE6       ;; DISABLE AGC, SET UP MUX
        NOP                      ; DISABLE SHIFT REGISTER FOR 5 usec
        NOP
        NOP
        MOV     P1,#STATE7       ;; ENABLE SHIFT REGISTER MAINST1:
        SETB    IE.0             ;; ENABLE 010 DETECTOR
        ORL     PCON,#1          ;; ENABLE IDLE MODE,... WAIT FOR INTERRUPT
        MOV     P1,#STATE8       ;; ENABLE AGC
        CLR     TCON.4           ;; STOP TIMER 0
        MOV     TH0,#TH0ST       ;; LOAD TIMER HIGH BYTE
        MOV     TL0,#TL0ST       ;; LOAD TIMER LOW BYTE
        SETB    TCON.4           ;; START TIMER
        SETB    P3.4             ; ENABLE CLOCK1
        INC     MST1             ; INCREMENT THE MISSED ST BURST COUNTER
        ORL     PCON,#1          ;; ENABLE IDLE MODE,... WAIT FOR INTERRUPT
```

```
        MOV     P1,#STATE9      ;; DISABLE AGC, SET UP MUX
        NOP                     ;  DISABLE SHIFT REGISTER FOR 5 usec
        NOP
        NOP
        MOV     P1,#STATE10     ;; ENABLE SHIFT REGISTER
MAINST2:
        SETB    IE.0            ;; ENABLE 010 DETECTOR
        ORL     PCON,#1         ;; ENABLE IDLE MODE,... WAIT FOR INTERRUPT
        MOV     P1,#STATE11     ;; ENABLE AGC
        CLR     TCON.4          ;; STOP TIMER 0
        MOV     TH0,#TH0ST      ;; LOAD TIMER HIGH BYTE
        MOV     TL0,#TL0ST      ;; LOAD TIMER LOW BYTE
        SETB    TCON.4          ;; START TIMER
        SETB    P3.5            ;  ENABLE CLOCK2
        INC     MST2            ;  INCREMENT THE MISSED ST BURST COUNTER
        ORL     PCON,#1         ;; ENABLE IDLE MODE,... WAIT FOR INTERRUPT
        MOV     P1,#STATE12     ;; DISABLE AGC, SET UP MUX
        NOP                     ;  DISABLE SHIFT REGISTER FOR 5usec
        NOP
        NOP
        MOV     P1,#STATE13     ;; ENABLE SHIFT REGISTER
MAINST3:
        SETB    IE.0            ;; ENABLE 010 DETECTOR
        ORL     PCON,#1         ;; ENABLE IDLE MODE,... WAIT FOR INTERRUPT
        MOV     P1,#STATE14     ;; ENABLE AGC
        CLR     TCON.4          ;; STOP TIMER 0
        MOV     TH0,#TH0ST      ;; LOAD TIMER HIGH BYTE FOR ST BURST LENGTH
        MOV     TL0,#TL0ST      ;; LOAD TIMER LOW BYTE
        SETB    TCON.4          ;; START TIMER
        SETB    P3.6            ;  ENABLE CLOCK3
        INC     MST3            ;  INCREMENT THE MISSED ST BURST COUNTER
        ORL     PCON,#1         ;; ENABLE IDLE MODE,... WAIT FOR INTERRUPT
        MOV     P1,#STATE0      ;; DISABLE AGC, SET UP MUX FOR LINE CARD
        ORL     PCON,#1         ;; ENABLE IDLE MODE ... WAIT FOR TIMER1 INT
        JMP     MAIN            ;; RESTART IF EVER GET HERE(CHECK TMR1INT)
.PAGE
.SBTTL "Loopback Routine"
;       This routine controls the repeater timing during loopback.
;       When in loopback, the repeater transmits a 101 pattern immediately
;       following the end of the line card burst (plus guard band). When
;       commanded to exit loopback state, the repeater transmits an all zero
;       burst and then reverts to normal operation.
;
LPBKLC:
        MOV     P1,#STATE15     ;; SET UP MUX, CLEAR 010 DETECTOR,LPBK' ASSERTED
        NOP
        MOV     P1,#STATE16     ;; ENABLE SHIFT REGISTER, LPBK' ASSERTED
LPBKLCA:
        SETB    IE.0            ;; ENABLE 010 DETECTOR
        ORL     PCON,#1         ;; ENABLE IDLE MODE,... WAIT FOR INTERRUPT
        MOV     P1,#STATE17     ;; ENABLE AGC AND LPCK' ASSERTED
        MOV     TCON,#0         ;; STOP TIMERS
        MOV     TH0,#TH0LC      ;; LOAD TIMER 0 HIGH BYTE (BURST LENGTH)
        MOV     TL0,#TL0LC      ;; LOAD TIMER 0 LOW BYTE
        MOV     TH1,#TH1VAL     ;; LOAD TIMER 1 HIGH BYTE (FRAME LENTGH)
        MOV     TL1,#TL1VAL     ;; LOAD TIMER 1 LOW BYTE
        MOV     TCON,#01010000B ;; START TIMERS
        SETB    P3.7            ;  ENABLE CLOCK4 INTEGRATOR
        CALL    RDFCBIT         ;; PROCESS FRAME/COMMAND DATA
        CALL    CRSMON          ;  CHECK THE ST CLOCK ENABLES
        JB      F0,LBEND        ;; CHECK IF LOOPBACK DISABLE SIGNAL RECEIVED
LPBKLCB:
        ORL     PCON,#1         ;; ENABLE IDLE MODE,... WAIT FOR INTERRUPT
        MOV     P1,#STATE18     ;; DISABLE AGC, SET UP MUX, CLEAR 010 DETECTOR
        NOP                     ;; WAIT FOR ...
        NOP                     ;; ... LINE ...
        NOP                     ;; ... TO TURN AROUND
        NOP
        NOP
        NOP
        NOP
        MOV     P1,#STATE19     ;; ENABLE SHIFT REGISTER
```

```
LBST0:
        NOP                             ;; DELAY ABOUT 5 MICROSECONDS
        NOP                             ;; ... THEN TRANSMIT...
        NOP                             ;; ... A 101 PATTERN...
        NOP                             ;; ... IN ST0'S SLOT.
        NOP
        MOV     P1,#STATE20             ;; ENABLE AGC AND TRANSMIT 010 DATA IN ST0 SLOT
        CLR     TCON.4                  ;; STOP TIMER 0
        MOV     TH0,#TH0ST              ;; LOAD TIMER HIGH BYTE (BURST LENGTH)
        MOV     TL0,#TL0ST              ;; LOAD TIMER LOW BYTE
        SETB    TCON.4                  ;; START TIMER
        MOV     P1,#STATE21             ;; ENABLE ALL ONES TRANSMIT IN ST0 SLOT
        ORL     PCON,#1                 ;; ENABLE IDLE MODE,... WAIT FOR INTERRUPT
        MOV     P1,#STATE22             ;; DISABLE AGC, SET UP MUX STOP ST0 TRANSMIT
        CLR     TCON.4                  ;; STOP TIMER 0
        ORL     PCON,#1                 ;; ENTER IDLE MODE ... WAIT FOR TMR1INT
        JMP     LPBKLC                  ;; RESTART LOOPBACK ROUTINE

LBEND:
        ORL     PCON,#1                 ;; ENABLE IDLE MODE,... WAIT FOR INTERRUPT
        MOV     P1,#STATE18             ;; DISABLE AGC, SET UP MUX, CLEAR 010 DETECTOR
        NOP                             ;; WAIT FOR ...
        NOP                             ;; ... LINE ...
        NOP                             ;; ... TO TURN AROUND
        NOP
        NOP
        NOP
        NOP
        NOP
        MOV     P1,#STATE19             ;; ENABLE SHIFT REGISTER
LBENDST0:
        NOP                             ;; DELAY ABOUT 5 MICROSECONDS ...
        NOP                             ;; ... THEN TRANSMIT ...
        NOP                             ;; ... ALL ZEROES INSTEAD ...
        NOP                             ;; ... OF THE 101 PATTERN
        NOP
        MOV     P1,#STATE24             ;; ENABLE AGC AND DISABLE ST0 TRANSMIT DATA
        CLR     TCON.4                  ;; STOP TIMER 0
        MOV     TH0,#TH0ST              ;; LOAD TIMER HIGH BYTE (BURST LENGTH)
        MOV     TL0,#TL0ST              ;; LOAD TIMER LOW BYTE
        SETB    TCON.4                  ;; START TIMER
        ORL     PCON,#1                 ;; ENABLE IDLE MODE,... WAIT FOR INTERRUPT
        MOV     P1,#STATE22             ;; DISABLE AGC, SET UP MUX
        ORL     PCON,#1                 ;; ENTER IDLE MODE AND WAIT FOR TIMER1 INTERRUPT
        JMP     MAIN                    ;; RETURN TO NORMAL OPERATION
.PAGE
.SBTTL "Read Framing / Control Bit Routine"
;       This routine reads the just received frame bit from p1.7 and p1.6
;       inserts it into the frame bit register and control bit register.
;       If all bits have been read the carry bit is set otherwise the
;       carry bit is cleard.
;
RDFCBIT:
        MOV     C,P3.1                  ;; READ FRAME BIT INTO CARRY
        MOV     A,R1                    ;; GET FRAME REGISTER HIGH BYTE
        RRC     A                       ;; SHIFT LSB INTO CARRY
        MOV     R1,A                    ;; SAVE NEW HIGH BYTE
        MOV     A,R0                    ;; GET FRAME REGISTER LOW BYTE
        RRC     A                       ;; SHIFT IN NEW MSB
        MOV     R0,A                    ;; SAVE NEW LOW BYTE
;
        MOV     C,P3.0                  ;; READ CONTROL BIT INTO CARRY
        MOV     A,R3                    ;; GET CONTROL REGISTER HIGH BYTE
        RRC     A                       ;; SHIFT LSB INTO CARRY
        MOV     R3,A                    ;; SAVE NEW HIGH BYTE
        MOV     A,R2                    ;; GET CONTROL REGISTER LOW BYTE
        RRC     A                       ;; SHIFT IN NEW MSB
        MOV     R2,A                    ;; SAVE NEW LOW BYTE
;
        DJNZ    R6,RDFCB10              ;; BRANCH IF MORE BITS TO ACQUIRE
        MOV     R6,#FRLEN               ;; RELOAD FRAME BIT COUNTER
        JMP     FNDFRAME                ;; PROCESS FRAME
```

```
RDFCB10:
        RET
.PAGE
.SBTTL  "Find Frame Routine"
;       This routine compares the received frame with the master frame
;       template:
;
;               1) If the frame was found and properly aligned, the
;                  command in the command register is processed.
;               2) If the frame was found but was miss aligned, the bit
;                  bit position error is corrected for and the routine
;                  once again returns.
;               3) If the frame is not found the routine returns to the
;                  main line.
;               4) IF FMMAX FRAMES ARE MISSED THEN RESET ALL THE CLOCK
;                       INEGRATORS.(CLR CLKRS0' TO CLKRS4')
;
FNDFRAME:
        CJNE    R0,#FTL,FNDF70    ;; BRANCH IF ERROR IN LOW BYTE
        CJNE    R1,#FTH,FNDF70    ;; BRANCH IF ERROR IN HIGH BYTE
        MOV     R5,#FMMAX         ;; RESET FRAME MISSED COUNTER ;
;       If the frame register was correct, check the command word for
;       proper parity.
;
        MOV     A,R3              ;; READ HIGH COMMAND BYTE
        XRL     A,R2              ;; EXCLUSIVE OR WITH LOW BYTE
        JNB     P,FNDFR00         ;; BRANCH IF NO TRANSMISSION ERROR
        RET
;
;       If the command register was intact, check for repeater commands.
;
FNDFR00:
        CJNE    R3,#LPBKENBL,FNDFR10 ;; BRANCH IF NOT LOOPBACK ENABLE
;
;       LOOPBACK ENABLE ROUTINE
;
        CLR     F0                ;; F0 CLEARED ON RECEIVE LOOPBACK ENABLE COMMAND
        RET FNDFR10:
        CJNE    R3,#LPBKDSBL,FNDFR20 ;; BRANCH IF NOT LOOPBACK ENABLE
;
;       LOOPBACK DISABLE ROUTINE
;
        SETB    F0                ;; SET F0 ON LOOPBACK END COMMAND RECEIVED
        CLR     P3.3              ;  CLEAR CLKRS0' TO CLKRS3' (ST CLOCKS)
        CLR     P3.4
        CLR     P3.5
        CLR     P3.6
FNDFR20:
        RET FNDF70:
        MOV     R7,#FRLEN         ;; GET FRAME LENGTH
FNDF80:
        MOV     A,R0              ;; GET LOW BYTE OF FRAME REGISTER
        RLC     A                 ;; C = MSBIT OF LOW BYTE
        MOV     A,R1              ;; GET HIGH BYTE OF FRAME REGISTER
        RLC     A                 ;; C = MSBIT OF HIGH BYTE
        MOV     R1,A              ;; SAVE NEW HIGH BYTE
        MOV     A,R0              ;; GET LOW BYTE OF FRAME REGISTER
        RLC     A                 ;; SHIFT IN MSBIT OF HIGH BYTE
        MOV     R0,A              ;; SAVE NEW LOW BYTE
        CJNE    R0,#FTL,FNDF90    ;; BRANCH IF ERROR IN LOW BYTE
        CJNE    R1,#FTH,FNDF90    ;; BRANCH IF ERROR IN HIGH BYTE
        DEC     R7                ;; COMPUTE BIT ERROR CORRECTION
        MOV     A,R7              ;; AND ...
        MOV     R6,A              ;; ... CORRECT FOR POSITION ERROR
        RET
```

```
FNDF90:
        DJNZ    R7,FNDF80           ;; BRANCH IF NO FRAME FOUND
        DJNZ    R5,FNDF100          ;; BRANCH IF RESYNC NOT REQUIRED
        JNB     F0,FNDF100          ;; BRANCH IF IN LOOPBACK
        MOV     R5,#FMMAX           ;; RESET FRAME MISSED COUNTER
        MOV     P3,#07H             ; RESET CLOCK INTEGRATORS(CLOCK0 TO CLOCK4)
FNDF100:
        RET                         ;; FRAME PATTERN NOT IN FRAME REGISTER

.PAGE
.SBTTL  "clock reset monitor routine"
;
;       this routine tries to determine if the st bursts being
;       received are valid, if not the clock for that st burst is reset
;
;       the routine compares the number of 010det' signals received from
;       the line card to the number of 010det' signals received from each
;       st burst. if the difference between the number of 010det' exceeds
;       the value MSTMAX then the clock is reset. the theory is the two
;       010det' signals should be similar, if not then reset the clock.
;       if the lc burst is not valid then the frame find routine will
;       detect that condition and reset all clocks.
;
;       the routine decrements each MST? counter and if zero it clears
;       the CFLAG? bit and resets the MST? counter.
;
;       in each st routine the MST? counter is incremented.
;
;
CRSMON:
        JNB     P3.3,CRSMON10       ;IF CLOCK0 RESET JUMP TO NEXT CLOCK
        DJNZ    MST0,CRSMON10       ;CHECK IF ST0 BURST INVALID
        CLR     P3.3                ;RESET CLOCK0
        MOV     MST0,#MSTMAX        ;RESET MISSED BURST COUNTER CRSMON10:
        JNB     P3.4,CRSMON20       ;IF CLOCK1 RESET JUMP TO NEXT CLOCK
        DJNZ    MST1,CRSMON20       ;CHECK IF ST1 BURST INVALID
        CLR     P3.4                ;RESET CLOCK1 INTEGRATOR
        MOV     MST1,#MSTMAX        ;RSET MISSED BURST COUNTER CRSMON20:
        JNB     P3.5,CRSMON30       ;IF CLOCK2 RESET JUMP TO NEXT CLOCK
        DJNZ    MST2,CRSMON30       ;CHECK IF ST2 BURST INVALID
        CLR     P3.5                ;RESET CLOCK2 INTEGRATOR
        MOV     MST2,#MSTMAX        ;RESET MISSED BURST COUNTER CRSMON30:
        JNB     P3.6,CRSMON40       ;CLOCK3 RESET JUMPT TO NEXT CLOCK
        DJNZ    MST3,CRSMON40       ;CHECK IF ST3 BURST INVALID
        CLR     P3.6                ;RESET CLOCK3 INTEGRATOR
        MOV     MST3,#MSTMAX        ;RESET MISSED BURST COUNTER CRSMON40:
        RET                         ;RETURN TO MAIN IN LC SECTION
        END
```

We claim:

1. A signal repeater for regenerating digitally encoded signals transmitted in bursts over a single pair telephone line to enable simultaneous communication between a telephone central office and a plurality of subscriber transmitter/receivers, said repeater comprising:
   (a) signal coupling means for decoupling said signals from said line for regeneration thereof by said repeater and for recoupling signals regenerated by said repeater onto said line;
   (b) clock recovery means for deriving clock frequency and phase information characteristic of said decoupled signals to facilitate accurate regeneration thereof;
   (c) data recovery means for decoding said decoupled signals and for regenerating said decoded signals to replicate the signals originally produced by said telephone central office and subscriber transmitter/receivers respectively;
   (d) data conversion means for re-encoding said regenerated signals for recoupling thereof onto said line; and,
   (e) signal processing means for controlling the operation of said signal coupling means, said clock recovery means, said data recovery means and said data conversion means.

2. A signal repeater as defined in claim 1, further comprising signal input control means for communicating said decoupled signals to said data recovery means, and for disabling such communication when said coupling means is recoupling said regenerated signals onto said line.

3. A signal repeater as defined in claim 2, wherein said data recovery means comprises:
 (a) first, second, third, fourth and fifth receivers for selectively receiving said decoupled signals from said telephone central office and from said subscriber transmitter/receivers respectively; and,
 (b) receiver selector means for selectably actuating one of said first, second, third, fourth or fifth receivers to pass decoupled signals originating from said telephone central office or from one of said subscriber transmitter/receivers.

4. A signal repeater as defined in claim 3, wherein said data recovery means further comprises first filter means for filtering signals passed by said receiver selector means to compensate for impedance differences in the communication path between said repeater, said telephone central office and said subscriber transmitter/receivers as said repeater is switched sequentially for communication with said telephone central office and with each of said subscriber transmitter/receivers.

5. A signal repeater as defined in claim 4, wherein said filter means comprises a variable filter having a single pole fixed at about 758 Khz. and having a single zero which may be variably set in a range of about 2.44 Khz. to about 408 Khz.

6. A signal repeater as defined in claim 4, wherein said data recovery means further comprises data comparator means for comparing the voltage of signals output by said filter means with a reference voltage signal and for producing a received data ("RDATA") output signal by generating a first binary signal when the voltage of signals output by said filter means exceeds said reference voltage, and a second binary signal when said reference voltage exceeds the voltage of signals output by said filter means.

7. A signal repeater as defined in claim 1, wherein said signal processing means further comprises data burst detector means for detecting within said decoupled, decoded signals a signal pattern signifying the start of a data burst transmission and for thereupon initiating recovery of said data burst by said data recovery means.

8. A signal repeater as defined in claim 6, where in said signal processing means further comprises timing control means for receiving said RDATA signal and for producing a binary data received ("BDR") output signal in response thereto.

9. A signal repeater as defined in claim 6, wherein said signal processing means further comprises data clock multiplexer means for receiving said RDATA signal and for producing a binary data recovered ("TXDATA") signal representative thereof.

10. A signal repeater as defined in claim 9, wherein said signal processing means further comprises signal loopback control means for detecting signal loopback commands transmitted from said telephone central office and for asserting in response thereto, as said TXDATA signal, the signal received by said repeater from said telephone central office.

11. A signal repeater as defined in claim 8, wherein said clock recovery means further comprises a phase detector for receiving said BDR signal, for detecting therein a signal pattern signifying the start of a data burst transmission and for thereupon initiating recovery of said clock frequency and phase information characteristic of said transmission.

12. A signal repeater as defined in claim 11, wherein said clock recovery means further comprises first, second, third, fourth and fifth oscillators for maintaining clock frequency and phase information characteristic of said decoupled signals received, respectively, from said telephone central office and from each of said subscriber transmitter/receivers.

13. A signal repeater as defined in claim 12, wherein said clock recovery means further comprises first, second, third, fourth and fifth integrators for variably controlling the phase of said first, second, third, fourth and fifth oscillators respectively in response to changes in the phase of signals received from said telephone central office and from said subscriber transmitter/receivers respectively.

14. A signal repeater as defined in claim 1, wherein said transmitted signals are encoded by applying thereto a modified duobinary code and are transmitted by time compression multiplexing thereof.

15. A signal repeater, as defined in claim 1, further comprising current sink/source means for selectably sinking or sourcing a small D.C. sealing current transmitted along said line.

16. A signal repeater as defined in claim 9, wherein said data conversion means re-encodes said regenerated signal by applying a modified duobinary transformation to said TXDATA signal.

17. A signal repeater as defined in claim 16, wherein said data conversion means further applies a time compression multiplexing transformation to said TXDATA signal.

* * * * *

UNITED STATES PATENT AND TRADEMARK OFFICE
CERTIFICATE OF CORRECTION

PATENT NO. : 4,766,606

DATED : August 23, 1988

INVENTOR(S) : Bardutz et al.

It is certified that error appears in the above-identified patent and that said Letters Patent is hereby corrected as shown below:

```
Column  3, line 20, "re-ceivers" should be --receivers--;

Column  4, line 56, "subsec-tion" should be --subsection--;

line 68, "subsec-tion" should be --subsection--;

Column  5, line 22, delete "-";

Column  7, line 13, delete "-";

Column  9, line 14-15, "sink -/source" should be
                      --sink/source--;

Column 12, line 25-26, "sink -/source" should be
                      --sink/source--;

Column 13, line 12, "trans mitted" should be --transmitted--

Column 15, line 43-44, delete "-";
```

UNITED STATES PATENT AND TRADEMARK OFFICE
CERTIFICATE OF CORRECTION

PATENT NO. : 4,766,606
DATED : August 23, 1988
INVENTOR(S) : Bardutz et al.

It is certified that error appears in the above-identified patent and that said Letters Patent is hereby corrected as shown below:

Column 16, line 15, "multipler" should be --multiplexer--;

Column 18, line 9, "tl:us" should be --thus--;

Column 19, line 28, change "STAR" to --START.--;

Column 20, line 60 change "$\pm 4.5$" to --+4.5--;

Column 21, line 43, "44 K" should be --44K--;

Column 23, line 2, "+5 v." should be --$\pm$5v.--;

Column 24, line 3, "op timize" should be --optimize--;

line 11, "al terations" should be --alterations--

Signed and Sealed this

Eighth Day of August, 1989

Attest:

DONALD J. QUIGG

*Attesting Officer*　　　*Commissioner of Patents and Trademarks*